(12) United States Patent
Kerber

(10) Patent No.: US 10,823,832 B2
(45) Date of Patent: Nov. 3, 2020

(54) REMOTE SENSING BY PERIODICALLY INHIBITED PULSE SIGNALS

(71) Applicant: Thierry Kerber, Paris (FR)

(72) Inventor: Thierry Kerber, Paris (FR)

(*) Notice: Subject to any disclaimer, the term of this patent is extended or adjusted under 35 U.S.C. 154(b) by 325 days.

(21) Appl. No.: 15/755,742

(22) PCT Filed: Sep. 1, 2016

(86) PCT No.: PCT/EP2016/025094
§ 371 (c)(1),
(2) Date: Feb. 27, 2018

(87) PCT Pub. No.: WO2017/059961
PCT Pub. Date: Apr. 13, 2017

(65) Prior Publication Data
US 2018/0239009 A1   Aug. 23, 2018

(30) Foreign Application Priority Data
Sep. 3, 2015  (FR) .................................. 15 70033

(51) Int. Cl.
*G01S 13/22* (2006.01)
*G01S 17/10* (2020.01)
*G01S 15/10* (2006.01)

(52) U.S. Cl.
CPC ............ *G01S 13/22* (2013.01); *G01S 15/105* (2013.01); *G01S 17/10* (2013.01)

(58) Field of Classification Search
CPC ............................................. G01S 13/22–227
See application file for complete search history.

(56) References Cited

U.S. PATENT DOCUMENTS 3,631,490 A * 12/1971 Palmieri ............... G01S 7/2923
                                                    342/160
4,721,958 A *  1/1988 Jenkin .................... G01R 23/02
                                                    327/415

(Continued)

FOREIGN PATENT DOCUMENTS

EP    1431774 A1    6/2004
WO    2015001432 A1  1/2015

OTHER PUBLICATIONS

International Search Report for PCT/EP2016/025094, dated Dec. 15, 2016.

(Continued)

*Primary Examiner* — Peter M Bythrow
(74) *Attorney, Agent, or Firm* — Meagher Emanuel Laks Goldberg & Liao, LLP

(57) ABSTRACT

In an emission process for remote sensing, pulse signals (630) are periodically produced in elementary time windows spaced one pulse period (T) apart, and waves corresponding to those signals are emitted towards remote objects, so as to enable to monitor waves transmitted by those objects upon receiving the emitted waves. The emission of those waves is periodically prevented, according to at least one inhibition period (3T, 5T) proportional to the pulse period and equal to at least three times that pulse period. Parameters are set, suited to producing measurement information on the objects from the wave monitoring, based on at least part of a frequency content of the transmitted waves to which the pulse and inhibition periods contribute. Applications to lidars, radars, active sonars and ultrasound monitoring.

24 Claims, 9 Drawing Sheets

(56) References Cited

U.S. PATENT DOCUMENTS

| | | | | |
|---|---|---|---|---|
| 4,931,800 | A * | 6/1990 | Ward | G01S 7/4004 |
| | | | | 342/162 |
| 7,145,954 | B1 * | 12/2006 | Pendergrass | H04B 1/7172 |
| | | | | 375/247 |
| 2003/0095609 | A1 * | 5/2003 | Cowie | H04B 1/692 |
| | | | | 375/316 |
| 2003/0147480 | A1 * | 8/2003 | Richards | H04B 1/71637 |
| | | | | 375/343 |
| 2005/0089083 | A1 * | 4/2005 | Fisher | H04B 1/7075 |
| | | | | 375/130 |
| 2005/0275588 | A1 * | 12/2005 | Schiffmiller | G01S 5/02 |
| | | | | 342/387 |
| 2014/0231679 | A1 | 8/2014 | Kremeyer et al. | |

OTHER PUBLICATIONS

Erez Ben-Yaacov et al: "Inter-pulse coding and coherent-on-receive modifications of magnetron-based marine radar experimental results", Microwaves, Communications, Antennas and Electronics Systems (COMCAS), 2011 IEEE International Conference on, IEEE, Nov. 7, 2011 (Nov. 7, 2011).pp. 1-9.

Levanon N: "Mitigating Range Ambiguity in High PRF Radar using Inter-Pulse Binary Coding", IEEE Transactions on Aerospace and Electronic Systems, IEEE Service Center, Piscataway, NJ, US, vol. 45, No. 2, Apr. 1, 2009 (Apr. 1, 2009), pp. 687-697.

* cited by examiner

REMOTE SENSING BY PERIODICALLY INHIBITED PULSE SIGNALS

TECHNICAL FIELD

The present invention relates to a device and a process for remote sensing by means of pulse signals, in emission and/or in reception. It concerns generally the technologies using waves sent towards objects to be probed, and is more particularly related to the fields of lidars, radars and sonars.

BACKGROUND ART

Remote sensing techniques, consisting in acquiring information on distant objects by means of measuring instruments having no contacts with those objects, are exploited in wide application ranges. They amount to sending waves towards those objects, retrieving waves transmitted in response to such loads, and analysing the received waves.

The term "transmission" as employed in the present disclosure covers any kind of wave propagation from a wave loaded object, and can refer notably to reflection, scattering, diffusion or fluorescence.

Thus, the radars (initially an acronym for RAdio Detection And Ranging) use radio waves reflected by a target. The lidars (initially an acronym for LIght Detection And Ranging) enable to conduct remote measurements based on the analysis of properties of a light beam transmitted back to its emitter, most often from a laser emission. The beams transmitted by the target can be reflected, backscattered in an elastic way (Rayleigh and Mie diffusions) or an inelastic way (Raman diffusion) or result from fluorescence. The sonars (initially an acronym for SOund Navigation And Ranging) rely on the sound propagation in water for detecting and studying submarine objects, and the active sonars provide for emitting sound pulses and listening to echoes.

Though those technologies are quite disparate, notably due to the concerned frequency ranges, wave types and target applications, their main principles are rooted in analogous aspects.

One of their points of commonality consists in the possible or systematic exploitation of periodically pulsed waves, sent towards the target objects. Each of those pulses is commonly subject to the modulation of a carrier frequency sensibly higher than the pulse repetition frequency. Typically, pulse compression relies on modulating each emitted pulse and on correlating a corresponding received signal with the emitted pulse, so as to increase range resolution.

The spectral effects linked notably to the pulse periodicity and duration are then often considered as parasitic, and various protocols and methods aim at eliminating or mitigating their effects. The pulse repetition is then mainly intended to average results out, or to follow up evolutions over time.

However, in various situations, those working modes prove insufficient to obtain appropriate information, notably in presence of mobile, complex or diffuse objects, or when information must be obtained on inherent properties of objects and not only e.g. on a position or a speed. One of the major reasons for those limitations is the use of one or several predefined modulation frequencies, which can prove improper or too restrictive for meeting such pursued objectives.

Typically, in the radar field, a pulse is usually emitted and reflected before a next pulse is emitted. This involves the existence of a distance range ambiguity and leads to defining a maximum range inversely proportional to the pulse repetition frequency (PRF). Increasing the inter-pulse quiet period, and thereby decreasing the PRF, thus provides a longer-range signal. By contrast, increasing the PRF enables easier detection due to higher emitted radio energy, but within a shorter maximum range.

The obtained information is generally focused on the distance and possibly velocity and/or surface configuration of detected objects.

Multiple methods have been proposed for extending the related unambiguous radar range beyond its conventional value. Some of them rely on not emitting selected pulses of a uniform pulse train.

In particular, the article "Inter-Pulse Coding and Coherent-on-Receive Modifications of Magnetron-Based Marine Radar Experimental Results" to E. Ben-Yaacov et al., IEEE, Nov. 7, 2011, pages 1-9, XP032120996, describes the exploitation of a magnetron-based non-coherent radar, in which a periodical coding of a Pulse Repetition Interval (PRI) is applied. In this respect, some of the pulses are omitted according to a binary sequence based on a Manchester coding, such a binary sequence being cross-correlated with a stored reference sequence.

Utilizing an incomplete pulse train has also been proposed in patent application EP-1431774 A1 (in the name of Thales) for pulse Doppler measurements, notably for a pulse-Doppler radar. Such a pulse train has a PRI sequence of modulated pulses in which some predefined pulses are not emitted, according to a regular pattern of pulses and gaps. This enables to release emission-reception schedules that can be exploited through pulse train interlacing, for example with a view to different look direction measurements.

Those documents rely on disconnecting the effects of successive pulses on the object to be probed. Indeed, the proximity of such successive pulses appears to be a source of undesirable interactions, of schedule unavailability or of supplementary power expense. Accordingly, the PRF is not intended to produce any specific spectral loading effect on the target object, but merely to provide return data at an appropriate pace.

Among the technologies developed for remedying the existing limits and constraints, systems for emitting very short pulses have been developed. Such pulses allow to cover a broad range of load frequencies and are thus potentially carrying a significantly higher amount of information.

In particular, as regards lasers, Q-switching allows the generation of output pulse beams having a high power, which can reach the gigawatt level. Mode-locking is another laser technique enabling to produce short and intensive light pulses, and is exploited in providing femtosecond lasers. Those techniques are however relatively complex and costly, and their applications remain focused today on specific situations.

Furthermore, it is known to exploit pulse repetition frequencies in some measurement techniques, notably for very high frequencies compared with the frequency ranges commonly used in the related fields. Such implementations, when possible, are however most often considered rather in terms of circumstantial commodities than for bringing added value regarding the analysis of remote objects.

In order to cover efficiently a broad range of load frequencies, it was proposed in patent document US-2009/0051926 A1 (in the name of NASA) to use a pulsed laser including a plurality of sources coupled to a modulator and respectively tuned to distinct and separated frequency ranges. The generated pulses are collectively amplified in a same amplifier. This achievement enables to extend significantly and simultaneously the excited frequency field, but at the expense of a complexity that is restricting it to specific applications fields.

Moreover, several methods exist for enabling short laser pulses (in the order of picoseconds) at high repetition rates, without penalizing the results. This includes autocorrelators or ultrafast photodiodes. In the patent document WO-2015/001432 A1 (inventor C. Braggio), a method is described for allowing to identify precisely the features of short and ultrashort pulses (down to tens of femtoseconds) having high repetition frequencies (up to tens of GHz), by means of radio waves generated by a crystal impacted by a pulse train. That information enables to neutralize measurement disturbances caused by the pulse nature of the emitted waves.

It was also observed in patent document US 2014/0231679 A1 (inventors K. Kremeyer et al.) that the effects generated by the interaction of laser pulses with a medium can be controlled by tuning the pulse parameters, such as notably the pulse durations and repetition frequencies.

SUMMARY

The present invention aims in particular at providing additional remote sensing tools enabling to modify the spectral properties of pulsed waves. More precisely, a purpose thereof is to offer complementary possibilities for simultaneous multi-frequency loading in the form of pulse signals allowing, in appropriate implementations, to complete and refine the measurement outputs in a flexible way.

In preferred embodiments, the invention aims at providing such tools for pulsed waves having a high repetition frequency and a short pulse duration.

Another objective of the invention is to allow, in some execution modes, a refinement of the emission spectrum in the neighbourhood of one or more modulation frequencies.

The invention is also aimed at enabling, in relevant cases, to obtain computation parameters helpful in interpreting the results precisely and efficiently, and to proceed quite swiftly and simply with changes in measurement adjustment variables.

The invention is broadly applicable to remote sensing methods possibly implementing pulsed waves, and can cover notably lidar, radar, sonar and ultrasound monitoring.

In this respect, an object of the invention is an emission device for remote sensing, comprising:
  at least one pulse generator, adapted to produce periodically pulse signals in elementary time windows, those time windows being successively spaced one pulse period apart,
  at least one wave emitter, adapted to emit waves towards at least one measurement object distant from the emission device, so as to enable to monitor waves having a frequency content, transmitted by the object(s) upon receiving at least part of the waves emitted by the device, that emitter being coupled with the pulse generator so that the emitted waves correspond to the pulse signals,
  at least one processor adapted to setting parameters suited to producing measurement information on the measurement object(s) from the wave monitoring, based on at least part of the frequency content.

The pulse generator(s), wave emitter(s) and processor(s) are such that the pulse period contributes to the at least part of the frequency content on which producing the measurement information is based.

According to the invention, the emission device comprises at least one pulse inhibition system configured for preventing periodically the emission of the waves by the emission device, according to at least one inhibition period proportional to the pulse period and equal to at least three times that pulse period. The pulse generator(s), wave emitter(s) and processor(s) are such that the inhibition period(s) also contribute(s) to the at least part of the frequency content on which producing the measurement information is based.

A measurement object designates any kind of surveyed matter, whether in a solid, gas, liquid or plasma state, or others. The object may thus have possibly a changing shape or an evolving constitution.

A pulse signal consists in a single and abrupt signal variation, which may possibly include itself regular or modulated oscillations, or a plurality of internal shorter pulses.

Producing measurement information "based on" part of a frequency content means that the concerned part of the spectral composition of the waves coming from the measurement object is intended to be exploited in the monitoring and analysis of received samples.

The pulse period "contributes" to the relevant part of the frequency content of the transmitted waves, in the sense that the associated spectrum is incorporating effects of the pulse period on interactions between the emitted waves and the measurement object, and that those effects are exploited in extracting the measurement information out of the waves received from the object.

A similar observation applies to the inhibition period. It can be observed that the disclosed emission device can enable accordingly to decrease in a controlled, flexible and possibly dynamic way a fundamental frequency of the emitted pulses and/or a fundamental offset frequency with respect to wave frequencies of the emitted pulses.

The contributions of the pulse and inhibition periods to the frequency content of the monitored transmitted waves may in particular translate into corresponding periodicities preserved from the emitted waves to the monitored waves. However, cases where such periodicities are modified are also covered, which may happen notably when the measurement objects are moving, due to the Doppler effect, or through inelastic scattering or photoluminescence in the interactions between the emitted waves and the measurement objects. The present disclosure also pertains to situations in which the repeated pulses in the emitted waves are not systematically turned to repeated pulses in the transmitted waves, but have more complex effects, due for example to fluorescence mechanisms at the measurement objects.

As well known to a person skilled in the art, the number of considered successive pulse periods and inhibition periods must be sufficient for their effective contributions to the frequency content on which producing the measurement information is based. Since the inhibition period is larger than the pulse period, that inhibition period dictates a representative time range.

Also, where more than one different inhibition periods are exploited (none of them being a multiple of any other), the representative time range must take the greatest of them into account. As will be clearer to the reader below, the representative time range is in fact preferably encompassing a sufficient number of the least common multiple of the different inhibition periods. In variant embodiments, however, multiples of the different inhibition periods above a threshold lower than, or a small number of times larger than, the least common multiple are disregarded in determining the time range, insofar as their contributions are deemed negligible.

A "sufficient number" of successive periods is advantageously greater than 100, preferably greater than 1000 and still preferably greater than 10,000. That number depends on various criteria, including without limitation the wave frequencies, the wave coherence or incoherence, the value of the pulse period, the use or not of modulation and if any, the modulation specificities, the exploitation of interferometry or not, the duty factor of the period pulses (ratio of the pulse duration to the pulse period), the type of remote sensing, the measurement object characteristics and complexity, the investigated information, and the measurement accuracy.

Several features of the emission device are directed to what happens downstream, at the levels of the measurement object and of the receiver. This regards the frequency content of the waves transmitted by the object and the determination of the measurement information from the monitoring of those waves. Those downstream functional aspects are in fact closely reflected in the constitution and/or settings of the emission device.

In particular, the emitted waves must be able to interact with the measurement object in such a way that the resulting waves transmitted by the object are carrying spectral information causally associated with the pulse and inhibition periods, which is adapted to be exploited for deriving the measurement information.

In this respect, the emission device is either taking care itself of the processing of the waves received from the object (which may be possibly performed through interferences between signals corresponding respectively to the emitted waves and to those received waves), or communicating relevant processing parameters to an appropriate reception set.

In the latter case, the relevant parameters communicated to the reception set are notably driven by having effects of the pulse and inhibition periods integrated and considered in the frequency spectrum of the transmitted waves for the monitoring and signal processing modes.

The set of parameters may notably include various items of information on a coded pulse sequence having a periodic pulse inhibition and/or on spectral processing data pertaining to a time sequence extending over multiple pulse waves.

As a matter of fact, the present disclosure belongs to the class of technologies in which the pulse repetition is made an integral part of the spectral loading which is exploited for gaining relevant information from interactions with probed objects.

Consequently, it contrasts in particular with conventional radar systems, in which the pulse signals correspond to dissociated interaction steps and for which what matters is the coupling of the sent waves with the probed objects within each pulse. The cross-processing of data between successive pulses, as carried out in some radar technologies, remains in line with that observation. This includes notably pulse-Doppler radars exploiting phase offsets over successive pulses for deriving velocity information, and radars with coded pulse sequences cross-correlated with reference sequences.

It can further be observed that pulse omissions in known PRI radar solutions, as implemented in the above-cited IEEE reference to Ben-Yaacov or EP-1431774 A1 patent application, is carefully deprived of any inhibition periodicity within a given pulse train. Even a partial periodicity would indeed have undesired effects, either by preventing efficient extension of the unambiguous range beyond the conventional limit (IEEE reference) or by entailing costly sequence redundancies in the processing of a covariance matrix built from signal samples (EP-1431774 A1).

In the class of technologies making use of the pulse periodicity for spectrally exciting a surveyed object, periodically omitting pulses is quite unexpected and contrasts strongly with usual practice.

Should a skilled person have considered the state of art in neighbouring fields so as to enhance data collecting, regularly omitting some of the pulses could have been envisaged as a way to facilitate signal processing or to enrich the information range. However, the skilled person would have established no connection between the frequency content of the transmitted waves exploited in producing measurement information, and an inhibition period.

Surprisingly, the pulse repetition periodicity is thus disturbed and made intermittent, while being able to remain potentially rich in information and in regulated interactions. That mode of controlled pulse modification offers a broad range of possibilities, for an emission frequency spectrum dominated by the repetition frequency as well as for a spectrum dictated essentially by fast intra-pulse modulations or coherent waves.

The invention further applies to macro-pulses made up of numerous micro-pulses.

The emission device makes possible, in some implementations, a use of conventionally exploited equipment, without requiring sophisticated additional means. It can thus, in advantageous embodiments, be particularly economical and convenient to use.

In addition, that device can potentially allow very flexible changes of the inhibition period(s), including in various configurations, thus enabling fast successive adjustments and/or cross-referencing and combinations of measurement information.

The operation of the emission device has notably the effect of refining the frequency spectrum with respect to the pulse period, with a ratio equal to the least common multiple of the factors associated with the inhibition periods. That effect is however weighted in function of the frequency configuration of the emitted waves. The operation has the concomitant effect of partially spreading the frequency spectrum between peaks related to the pulse frequency.

In some embodiments, the pulse generator and the wave emitter are not dissociated in particular in a laser.

The waves can be of various types depending on the embodiments. In particular, they can consist in acoustic, radio, ultrasound, or electromagnetic waves in the infrared, visible, ultraviolet or X-ray fields. Further, the wave transmission by the object can take place in any manner, such as notably by reflection, elastic or inelastic scattering (including in particular backscattering) or fluorescence.

The remote sensing can regard, among other fields, meteorology, air traffic control, astronautics, topography, geoscience and environment, vehicle remote control, autonomous car management, robotics, submarine detection, surface light characterization (hence notably Virtual Reality), object recognition, Internet of Things and biomedical engineering.

The invention is particularly attractive for swiftly refining complex data collecting on a surveyed object. In advantageous implementations, it can be especially relevant for finely characterizing surface properties of solid objects and volume properties of non-solid objects such as in particular gases, notably when those properties are wavelength-dependent. The probed properties may include notably geometric, structure and composition data.

Preferably, the inhibition system is configured so that the inhibition periods include at least two distinct inhibition periods, none of them being a multiple of any other. In advantageous embodiments, the inhibition system is then configured so that the distinct inhibition periods have ratios with respect to the pulse period which are pairwise coprime.

The exploitation of several ratios between the inhibition periods and the pulse period extends significantly the potentialities for tuning and refining the frequency spectrum. More precisely, it allows a controlled decrease of the fundamental repetition frequency of the emitted pulses, like with a unique inhibition period, but while at the same time assigning higher weights to dedicated harmonics (multiples of the fundamental frequency). Such implementations thereby leverage significantly the potential probing refinement capacity of the system.

Furthermore, pairwise coprime ratios offer notably the advantage of being able to provide simple analytical formulations, likely to facilitate precise computations and finer result interpretations.

The number of inhibition periods can be quite variable and depends on the kinds of intended applications. A small number, comprised between one and three, appears to provide generally outputs more readily accessible to measurements. Nevertheless, a higher number proves interesting for exploring frequencies with finer frequency steps.

In a first series of embodiments, the waves emitted by the emission device are unmodulated over each of the pulse signals.

In particular related implementations, those emitted waves having a frequency spectrum and the elementary time windows having a pulse duration, the emission device is configured so that the frequency spectrum is determined essentially by the pulse period and the pulse duration.

According to those embodiments, the pulses are decisive for the spectrum constitution, no carrier frequency and no frequency modulation playing a significant role within each pulse. More precisely, the pulse duration and the pulse repetition frequency (taking into account the modifications induced by the inhibition periods) determine then the frequency spectrum with a precision higher than 95%, and advantageously with an accuracy of 1% or less. In some embodiments, those pulses are micro-pulses making up groups of macro-pulses.

That precision is assessed in the following natural way. A theoretical reference rectangular pulse train is determined, comprising rectangular pulses having a same pulse duration and a same pulse period as the emitted waves. Each of those rectangular pulses has an amplitude that is associated with an energy corresponding to an averaged pulse energy in the effectively emitted waves. A difference between the effective pulse train and the theoretical reference rectangular pulse train results in a deviation pulse train.

A ratio between the energy contained in the deviation pulse train and the energy contained in the theoretical rectangular pulse train is then representative of the degree of accuracy in representing the effective pulse train by the theoretical rectangular pulse train. Namely, a pure (unrealistic) rectangular wave signal would correspond to a bias of 0%. The mentions above according to which the precision is higher than 95%, and advantageously with an accuracy of 1% or less, therefore mean that the energy ratio is respectively lower than 5% and lower than or equal to 1%.

Such configurations are possible notably in case of very short pulses (with respect to an operated range of shorter carrier wavelengths) together with incoherent waves over the pulse durations.

The inhibition period(s) is/are then able to provide precious information at intermediary frequencies between the frequencies that are multiples of the pulse frequency. It is thus made notably possible to refine the results obtained initially on the basis of regular periodic pulses, and then to iteratively complete the information. The user may also select a priori the most judicious corresponding parameters, thereby the relevant ratios for the inhibition periods. Another potential advantage is the simultaneous retrieval of various measurement information data, related to a plurality of intermediary frequencies located between the pulse frequency peaks.

In alternative implementations, the emission device is configured so that the unmodulated waves emitted by the emission device have a carrier frequency over the pulse durations that plays a determining role in the spectral composition of those waves, the waves being coherent on each pulse.

The pulse signals modulating the carrier waves in a coded way by means of the inhibition periods are then advantageously providing complementary spectral loading, which corresponds to offset frequencies with respect to the carrier frequency. Those offset frequencies are further distributed schematically around the carrier frequency, with frequency steps and associated amplitude weights given by the pulse and inhibition periods.

In a second series of embodiments, the elementary time windows having a pulse duration, the emission device is configured so that the waves emitted by the emission device comprise at least one modulation at a frequency higher than the reciprocal of the pulse duration.

This regards a classic case of pulsed waves, used notably with lidars (the modulation carrier frequencies being typically in the order of THz, the pulses being in the order of ns and the repetition frequencies in the order of GHz). The introduction of the inhibition periods has then the effect of weighting the evolution variables of the frequency signals around the modulation frequency or frequencies, and is likely to induce a spectral distribution of the signal that is more progressive than with convolutions associated exclusively with the pulse period and duration.

Those embodiments can, in some appropriate modes, prove useful notably for exploring more finely the reaction of objects to frequencies neighbouring the modulation frequency or the carrier frequency. They also offer potentially interesting and flexible parameters for acting notably against disturbances caused by short and ultrashort pulses in high-frequency measurements.

Several types of modulation are covered by the present disclosure, including in particular amplitude modulation, frequency modulation and phase modulation.

The two series of embodiments above are not exhaustive, the pulses carrying possibly for example a complex spectral content (such as e.g. chirping).

In a particular implementation of the inhibition system(s), the latter is adapted to cooperate with the pulse generator so that the pulse signals are truncated according to the inhibition period(s).

It is thus proceeded upstream, before going through the wave emitter. When feasible, that embodiment can be advantageous in that it is possible to act in several situations with known electronic means while having energy efficient operations.

In another implementation of the inhibition system(s), the latter is adapted to cooperate with the wave emitter so that the wave emission by the emitter is inactivated for the waves corresponding to the inhibition period(s).

It is thereby acted downstream, advantageously after the pulse generator has produced regular periodic signals at the pulse period and has communicated them to the wave emitter. A periodic transmission blocking can be operated in different ways depending on the concerned technologies, for example in optics by a system having controlled shutter(s) or mirrors.

Another object of the invention is a reception set for remote sensing comprising:
- at least one receiver of waves having a frequency content, transmitted by at least one object upon the reception by that object of waves emitted by at least one emission device, that receiver being adapted to generate signals corresponding to the received waves,
- at least one signal processing unit coupled with the wave receiver(s), configured for receiving and processing those signals so as to produce measurement information related to the object(s) based on at least part of the frequency content,
- at least one system for frequency consideration coupled with the receiver(s) and/or with the processing unit(s), configured for taking at least part of the frequency content of the transmitted waves into consideration, in order to generate the measurement information, that frequency consideration system being adapted to take into consideration a pulse period of the emitted waves so that the pulse period contributes to the at least part of the frequency content on which producing the measurement information is based.

According to the invention, the system for frequency consideration is configured to take into account at least one inhibition period proportional to the pulse period and equal to at least three times that pulse period, so that the inhibition period(s) also contribute(s) to the at least part of the frequency content on which producing the measurement information is based.

The reception set is thus appropriate to the exploitation of inhibition periods as described above.

Preferably, that reception set is adapted to waves transmitted by the object(s) from waves emitted by an emission device compliant with any of the embodiments disclosed above.

Preferably also, the reception set is configured to be coupled with such an emission device. In some embodiments, that coupling is a wired connection or the inclusion in a same apparatus. In other embodiments, it is achieved by remote communication making possible the exchange of relevant data.

Advantageously, the system for frequency consideration is configured so that the inhibition periods include at least two distinct inhibition periods, none of those distinct inhibition periods being a multiple of any other.

In a particular implementation, the system for frequency consideration is adapted to take into consideration a main frequency step corresponding to the pulse period of the emitted waves and at least one secondary frequency step corresponding to the inhibition period(s) and constituting at least one divisor or the main frequency step.

That consideration of the main and secondary frequency steps for generating the measurement information can be based notably on spectral filtering, interferometry with homodyne or heterodyne detection, or analog-to-digital conversion.

In advantageous embodiments, the main frequency step is worth the pulse repetition frequency (i.e. the reciprocal of the pulse period), while the at least one secondary frequency step is worth an associated at least one pulse inhibition frequency (i.e. the reciprocal of an associated at least one inhibition period). The ratios between the inhibition periods and the pulse period are then the same as the ratios between the main frequency step and the secondary frequency steps.

In other advantageous embodiments adapted to taking Doppler shifts into account, the main frequency step is equal to the product of the pulse repetition frequency by a factor given by speed characteristics of the measurement object, while the at least one secondary frequency step is equal to the product of the at least one pulse inhibition frequency by the same factor.

The invention also concerns a remote sensing set comprising at least one emission device compliant with any of the embodiments above, at least one reception set compliant with the definition given above, and at least one system for coupling the waves received by the receiver(s) with at least part of the waves emitted by the emitter, so as to produce interferences between the waves, the signal processing unit of the reception set being adapted to exploit the interferences for producing the measurement information based on the at least part of the frequency content.

Interferometry, adapted to the target frequency or frequencies by means of notably an appropriate modulation on the basis of the emission carrier frequency, can in some advantageous situations allow a high efficiency and measurement accuracy. In addition, the signals at the pulse frequency are likely to enable in multiple cases to obtain in a relatively straightforward and simple way the secondary frequencies excited under the effect of the periodic pulse inhibitions.

Another object of the invention is a remote sensing apparatus comprising an emission device and/or a reception set and/or a remote sensing set compliant with the present disclosure, that apparatus being a lidar, a radar, an active sonar or an ultrasound instrument.

The invention further concerns an emission process for remote sensing, including:
- periodically generating pulse signals in elementary time windows, those time windows being successively spaced one pulse period apart,
- emitting waves corresponding to the pulse signals towards at least one remote measurement object, so as to enable to monitor waves having a frequency content, transmitted by the object(s) upon receiving at least part of the emitted waves,
- setting parameters suited to producing measurement information on the measurement object(s) from the wave monitoring, based on at least part of the frequency content.

The pulse period contributes to the at least part of the frequency content on which producing the measurement information is based.

According to the invention, the process includes preventing periodically the emission of those waves, according to at least one inhibition period proportional to the pulse period and equal to at least three times that pulse period, the inhibition period(s) also contributing to the at least part of the frequency content on which producing the measurement information is based.

That emission process is preferably executed by an emission device compliant with the present disclosure, in any of its embodiments.

The invention further concerns a reception process for remote sensing including:
- receiving waves having a frequency content, transmitted by at least one object upon the reception by that or those object(s) of waves emitted by at least one emission device, generating signals corresponding to the received waves, receiving and processing those signals so as to produce measurement information related to the object(s) based on at least part of that frequency content.

That process is such that for producing the measurement information, a pulse period of the emitted waves is taken into consideration so that the pulse period contributes to the at least part of the frequency content on which producing the measurement information is based.

According to the invention, the process includes taking into consideration at least one inhibition period proportional to the pulse period and equal to at least three times that pulse period, so that the inhibition period(s) also contribute(s) to the at least part of the frequency content on which producing the measurement information is based.

The invention also pertains to a computer program adapted to perform steps of the above emission process for remote sensing and/or reception process for remote sensing.

It also regards a non-transitory program storage device, readable by a computer, tangibly embodying a program of instructions executable by the computer to perform a process compliant with the disclosure.

Such a non-transitory program storage device can consist, without limitation, in an electronic, magnetic, optical, electromagnetic, infrared, or semiconductor device, or in any suitable combination of the foregoing. As a purely illustrative and not exhaustive purpose, it can be a portable computer diskette, a hard disk, a ROM (Read-Only Memory), an EPROM (Erasable Programmable ROM) or a Flash memory, or a portable CD-ROM (Compact-Disc ROM).

LIST OF FIGURES

The invention will be better understood, and other specific features and advantages will emerge more clearly in the light of the following description of example embodiments, provided in a non-restrictive way with reference to the annexed drawings wherein.

Figure 1:
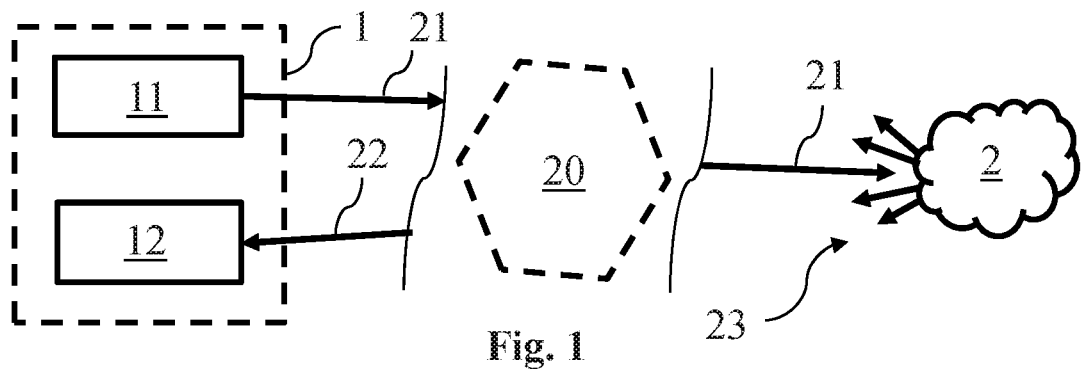
FIG. 1 is a schematic drawing representing the working of a remote sensing set compliant with the invention.
Figure 4A:
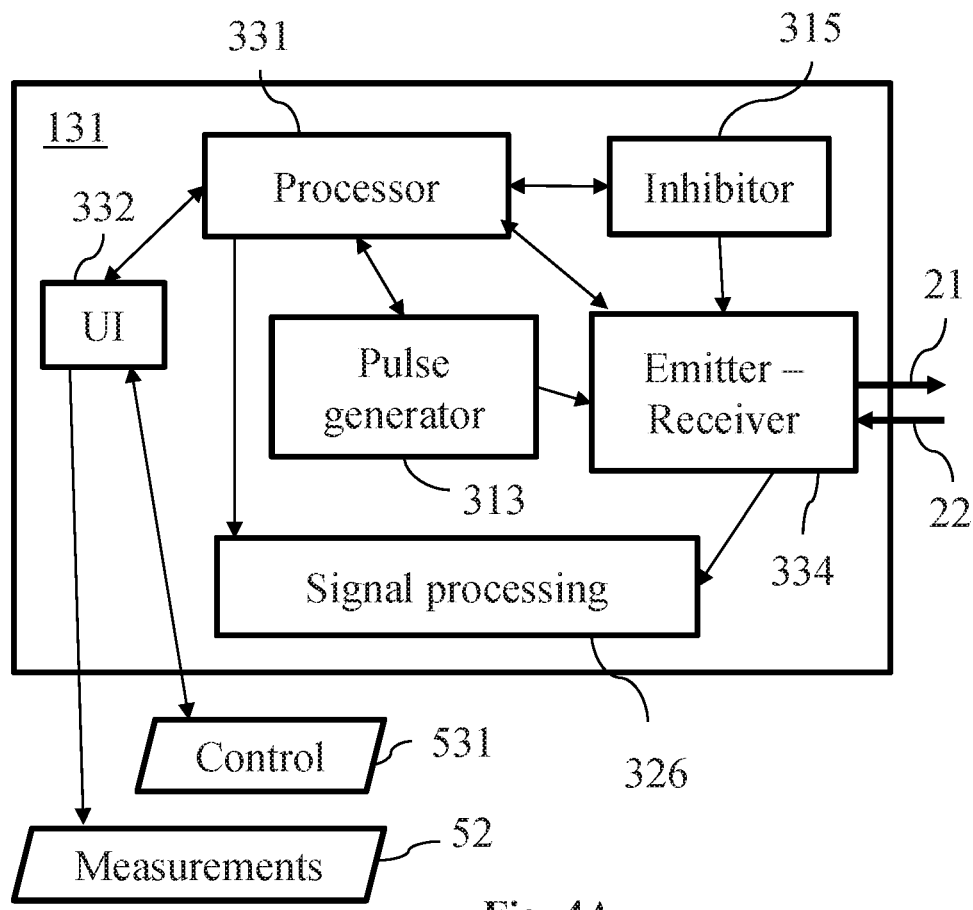
FIG. 4A illustrates as a block diagram a second embodiment of the sensing set of FIG. 1, involving a coupling by interferometry between the emission and reception parts.
Figure 4B:
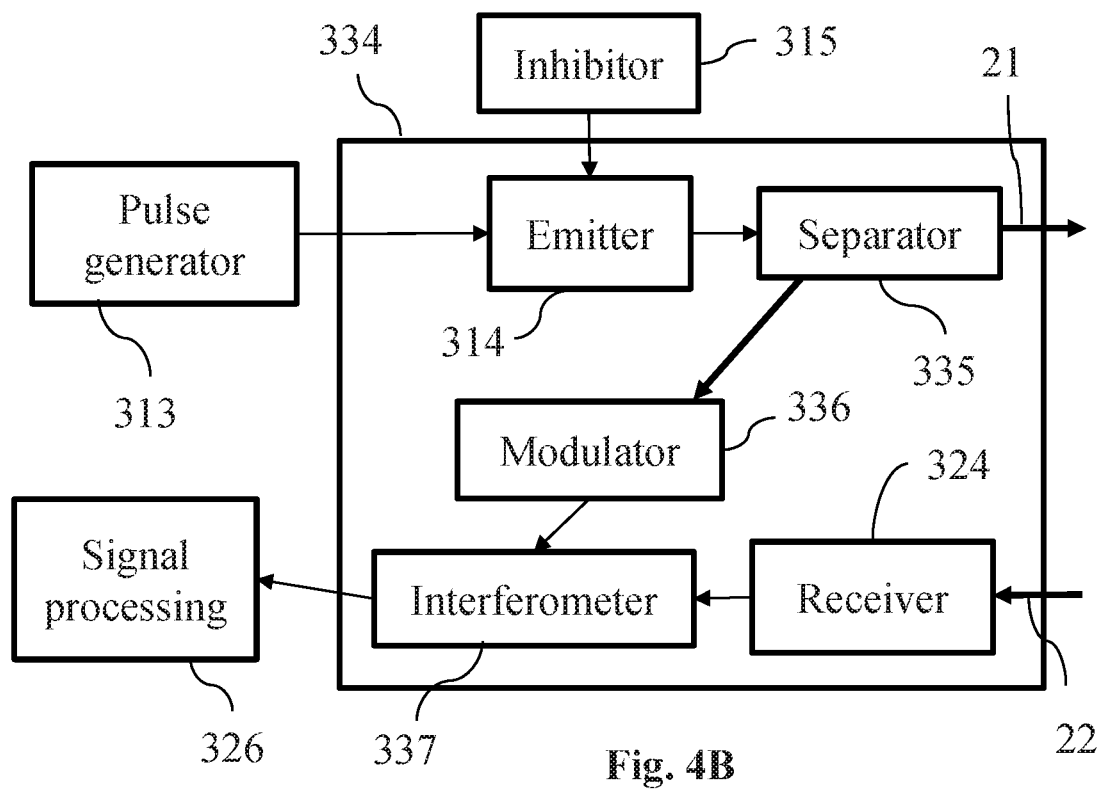
Figure 5A:
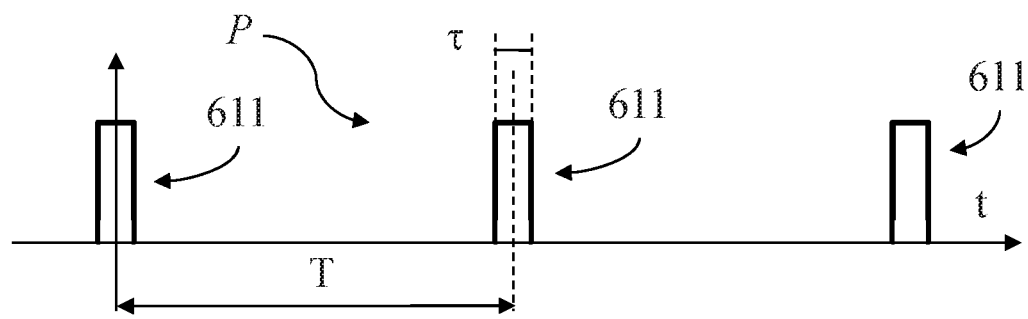
Figure 5B:
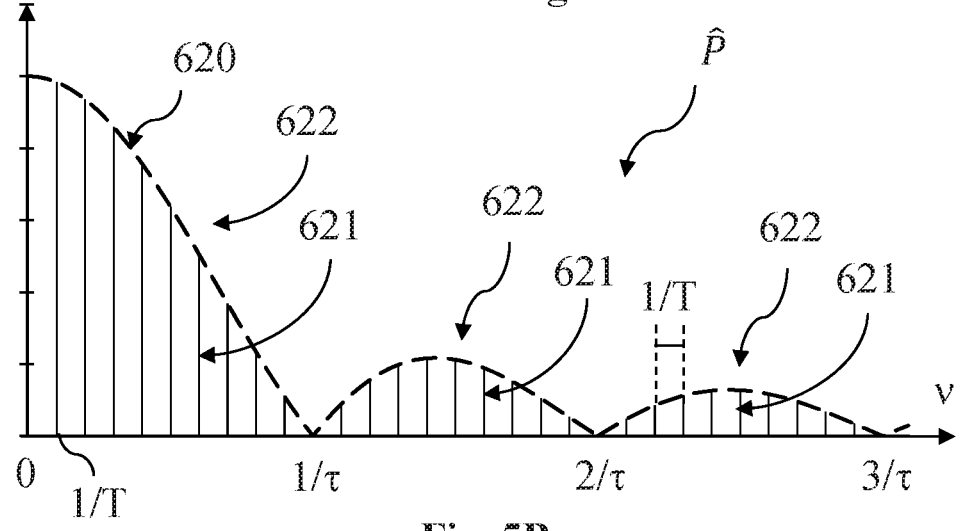
Figure 6:
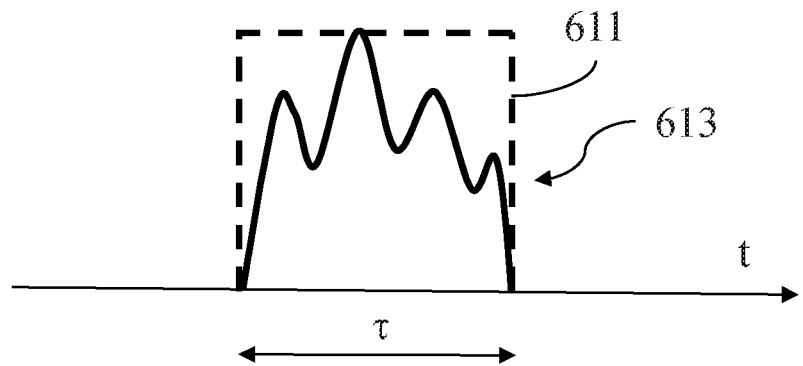
Figure 7:
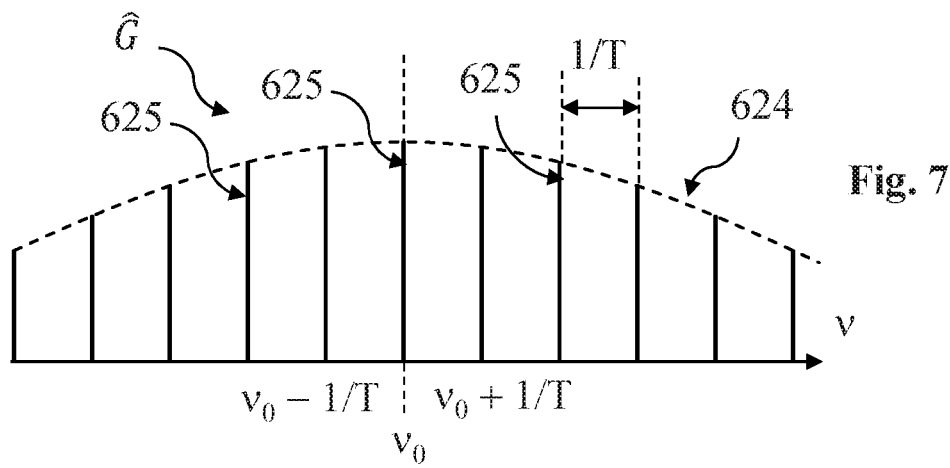
Figure 8A:
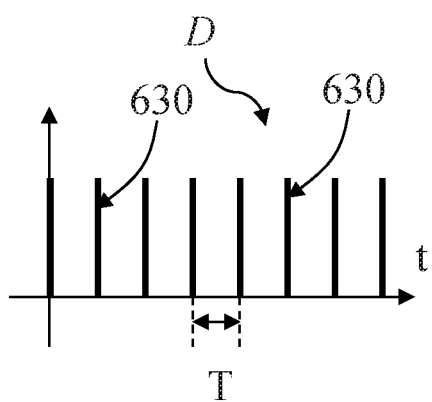
Figure 8B:
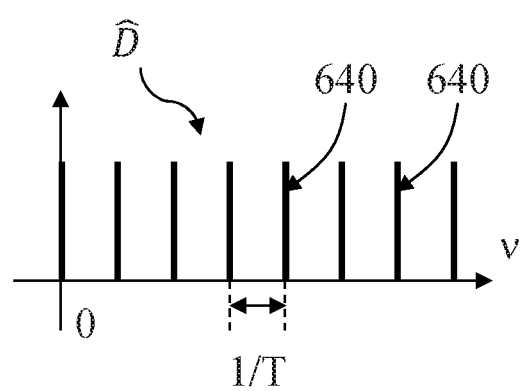
Figure 9A:
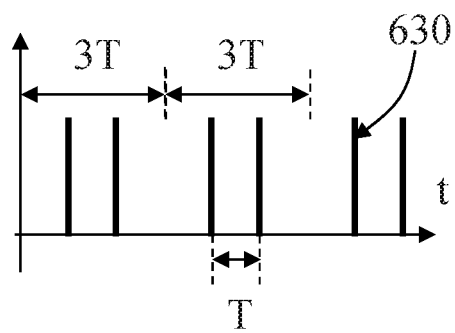
Figure 9B:
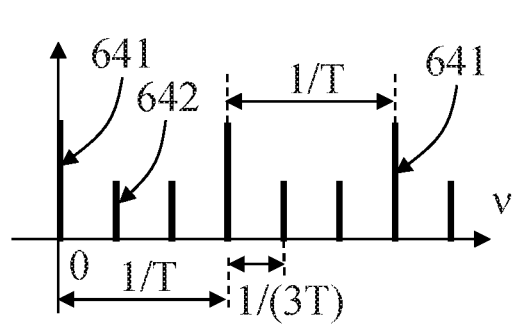
Figure 10A:
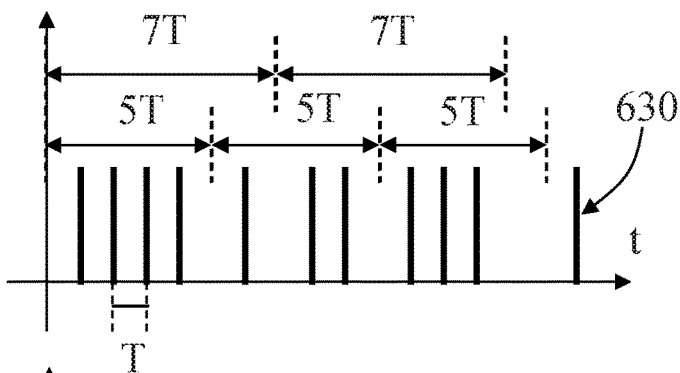
Figure 10B:
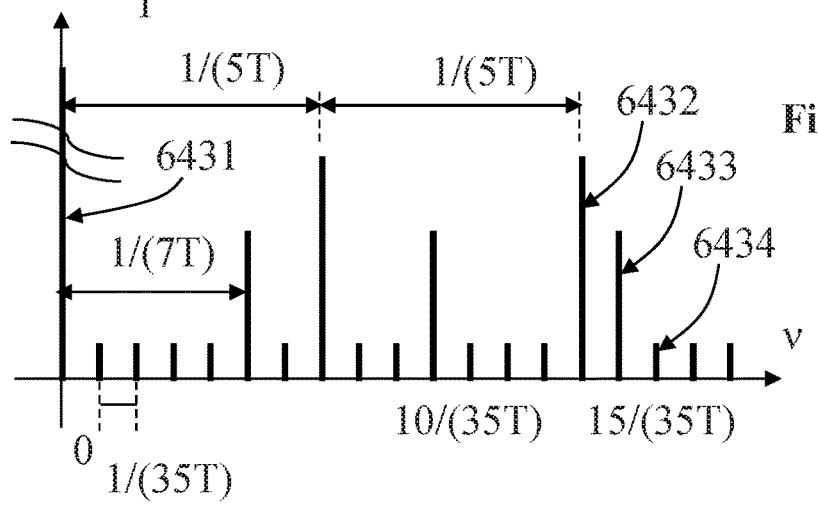
Figure 11A:
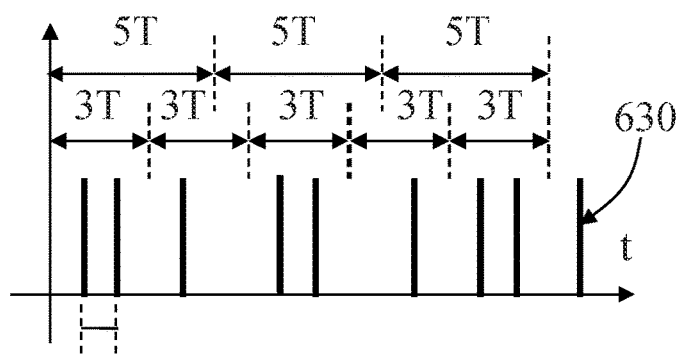
Figure 11B:
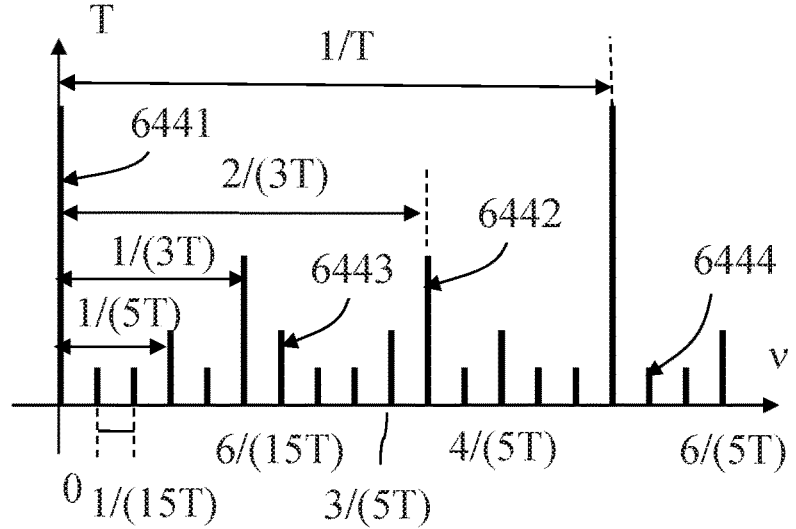
Figure 12A:
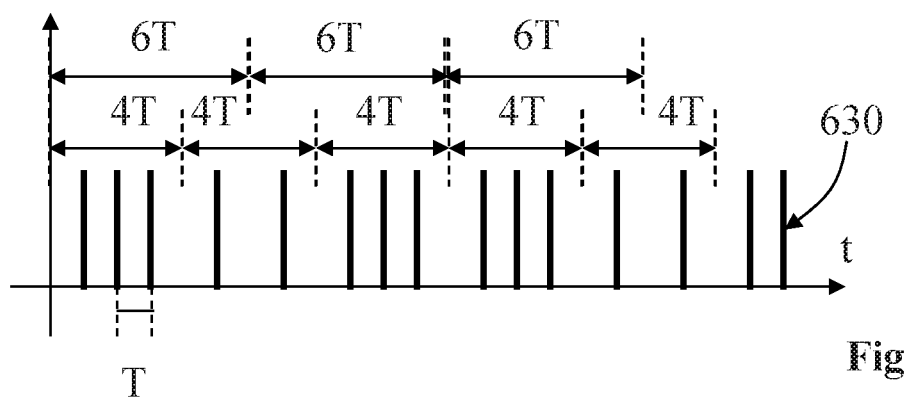
Figure 12B:
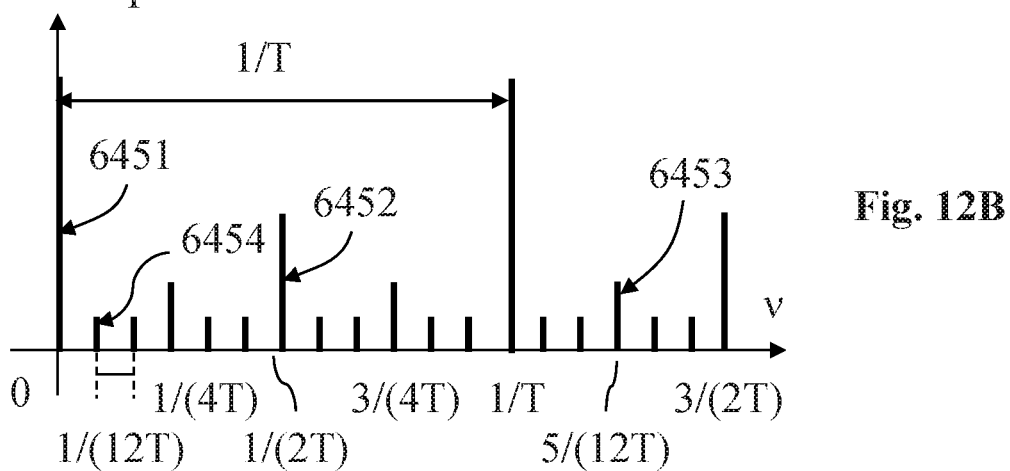
Figure 13:
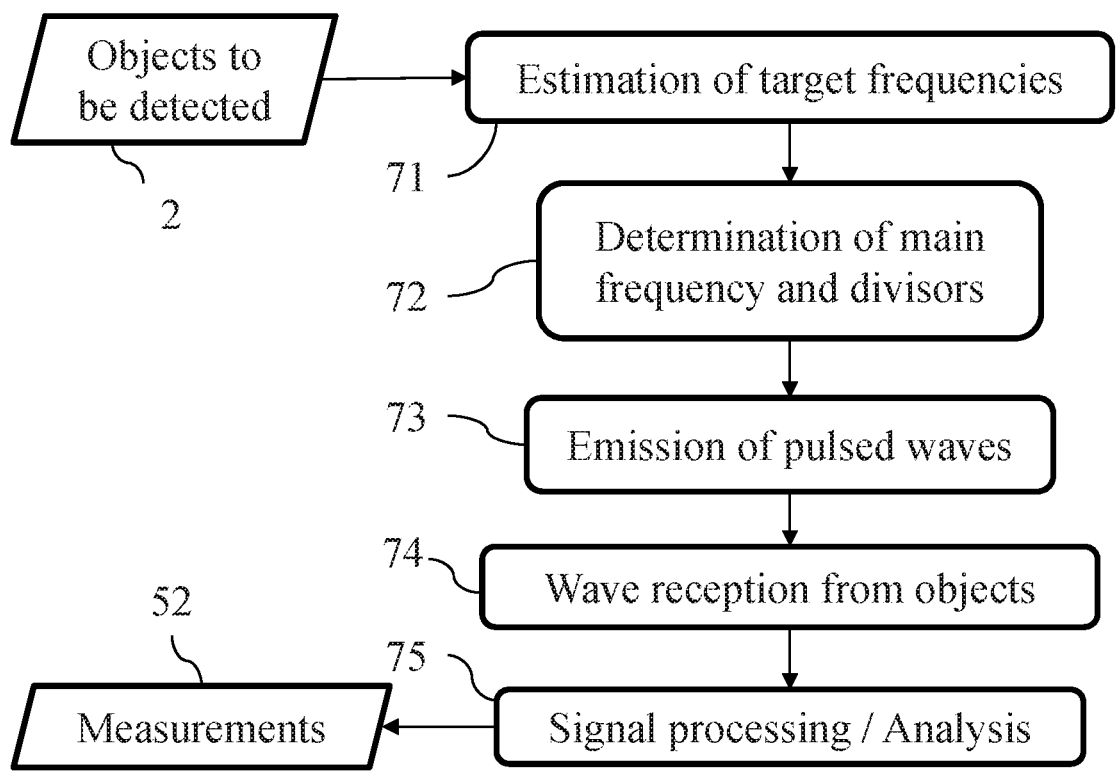
Figure 14:
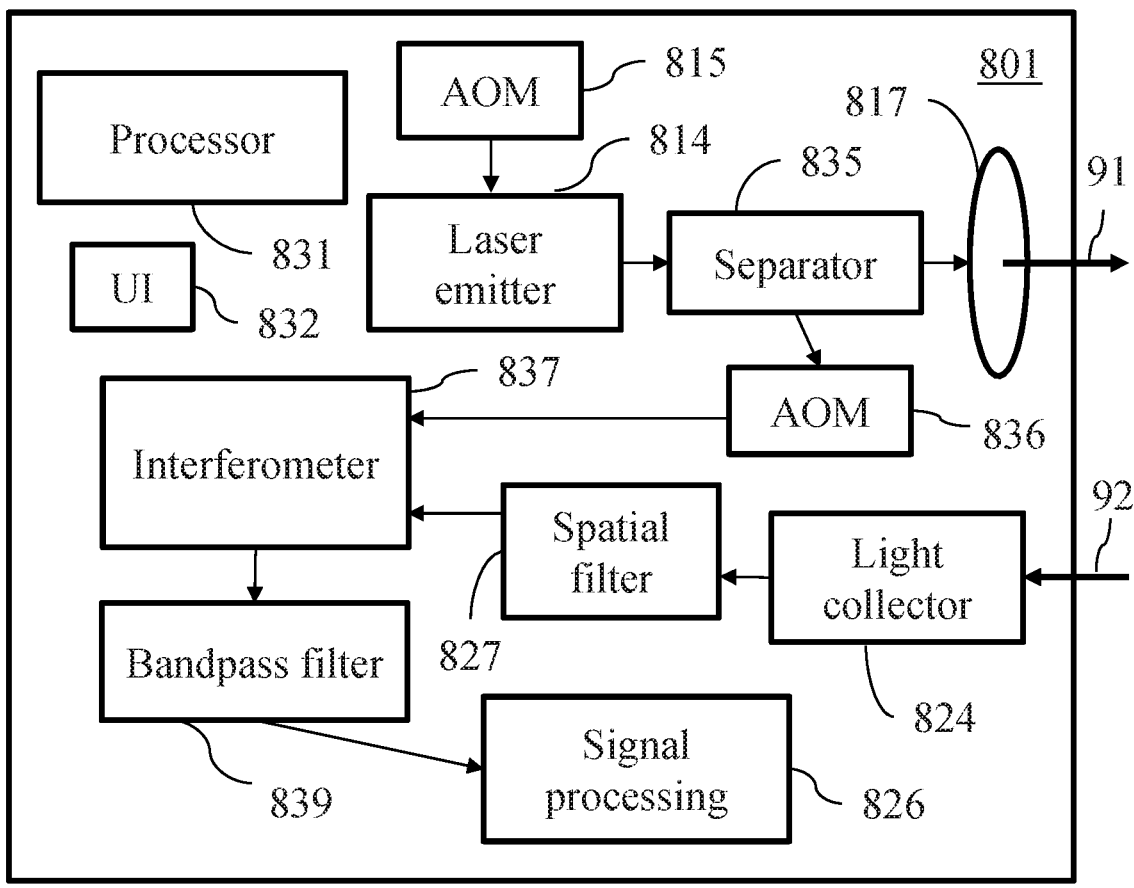
Figure 15:
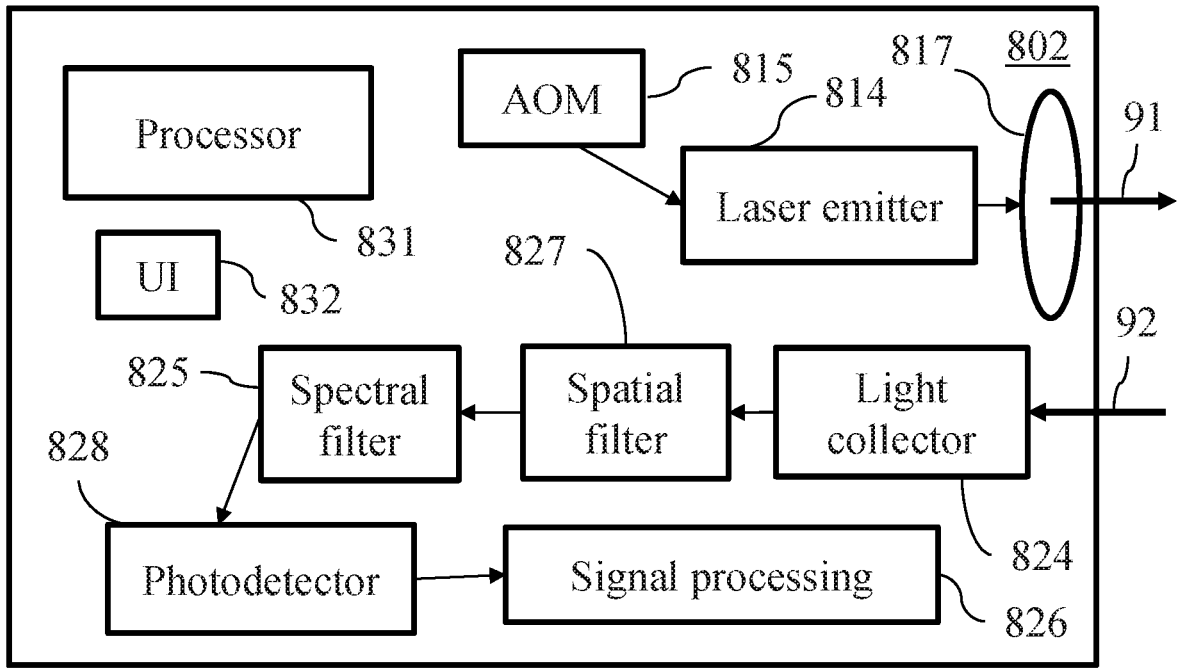
Figure 16:
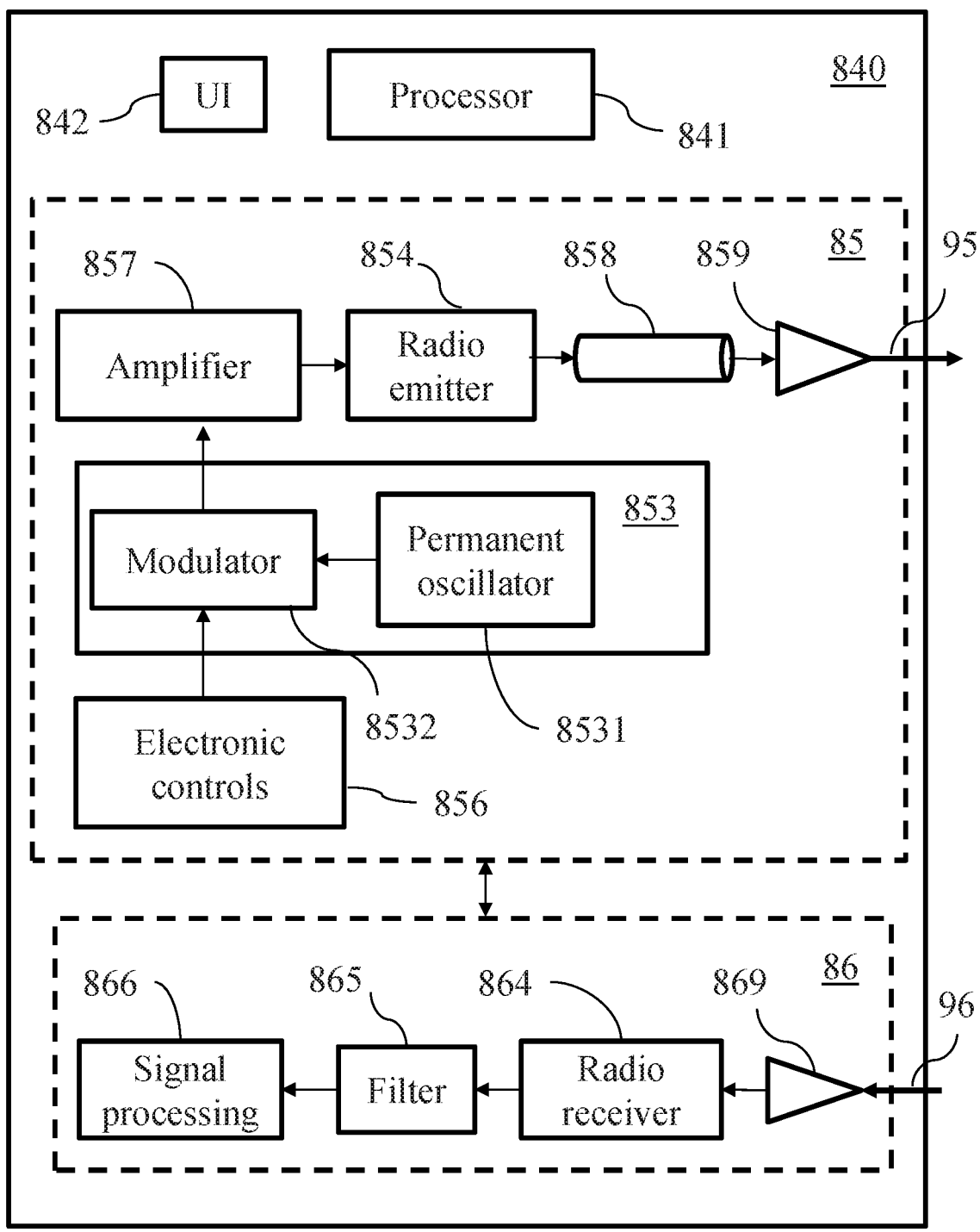
Figure 17:
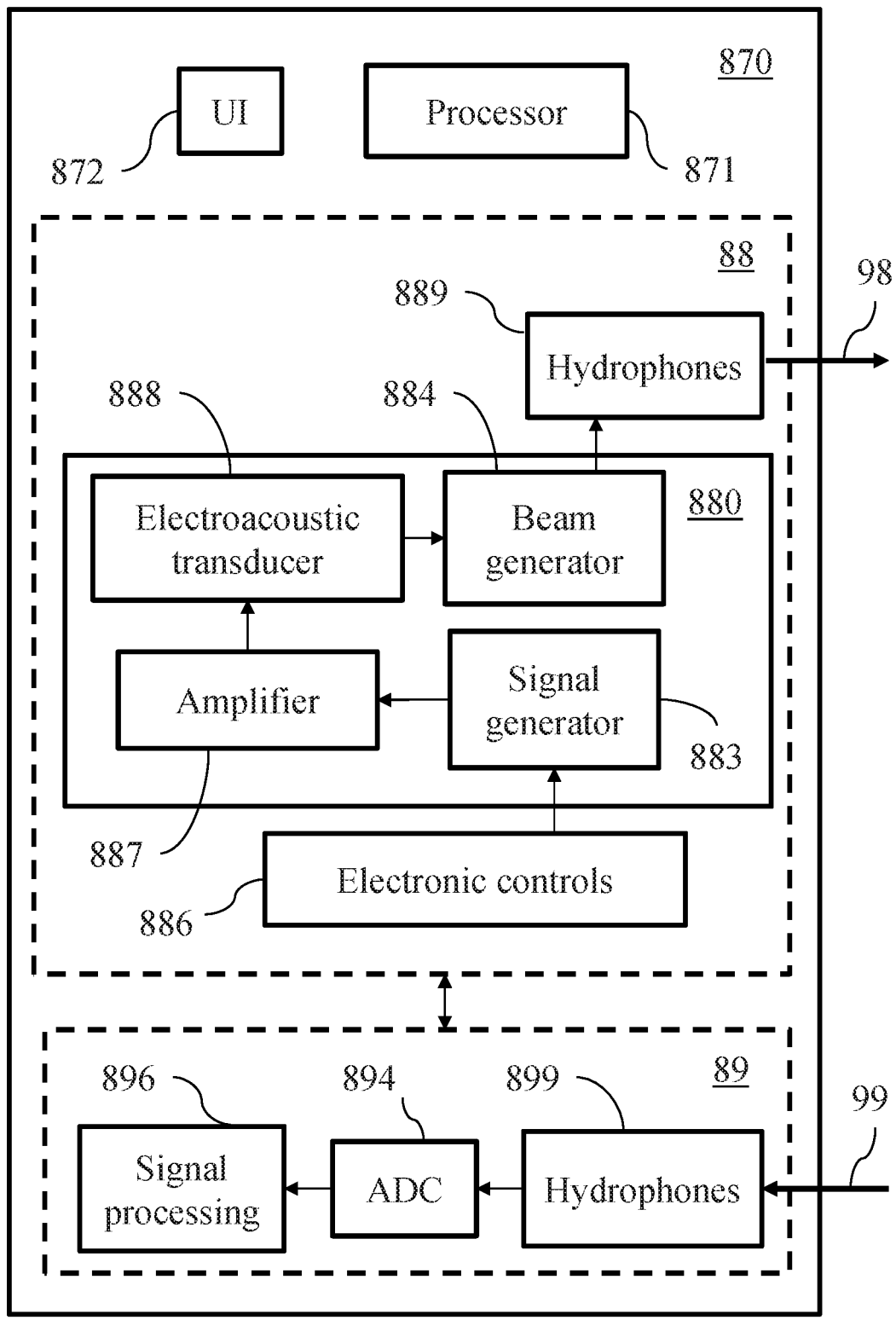

FIG. 4B details the emitter-receiver block of FIG. 4A;

FIG. 5A shows time periodic pulses in the form of gate signals;

FIG. 5B represents the Fourier transform of the signal of FIG. 5A, for a pulse repetition period equal to 10 times the pulse duration;

FIG. 6 represents a pulse time window in the case of a signal oscillating during the pulse duration;

FIG. 7 shows the frequency distribution of a signal modulated at a frequency $v_0$ during periodic pulse windows of period T;

FIG. 8A represents for sake of disclosure convenience a time periodic signal comprising instantaneous pulses (repeated Dirac);

FIG. 8B gives the frequency transformation of the signal of FIG. 8A;

FIG. 9A shows the introduction of an inhibition period equal to 3 times the pulse period in the theoretical diagram of FIG. 8A;

FIG. 9B gives the frequency transformation of the signal of FIG. 9A;

FIG. 10A shows the introduction of two inhibition periods equal respectively to 5 and 7 times the pulse period in the theoretical diagram of FIG. 8A;

FIG. 10B gives the theoretical frequency transformation of the signal of FIG. 10A;

FIG. 11A shows the introduction of two inhibition periods equal respectively to 3 and 5 times the pulse period in the theoretical diagram of FIG. 8A;

FIG. 11B gives the frequency transformation of the signal of FIG. 11A;

FIG. 12A shows the introduction of two inhibition periods equal respectively to 4 and 6 times the pulse period in the theoretical diagram of FIG. 8A;

FIG. 12B gives the frequency transformation of the signal of FIG. 12A;

FIG. 13 presents a flow chart of performing the remote sensing with the remote sensing set of FIG. 1;

FIG. 14 is a block diagram illustrating a lidar integrating the functionalities of a remote sensing set compliant with FIG. 1, in a first embodiment using interferometry;

FIG. 15 is a block diagram illustrating a lidar integrating the functionalities of a remote sensing set compliant with FIG. 1, in a second embodiment using spectral filtering at the receiver level;

FIG. 16 is a block diagram illustrating an implementation of a radar integrating the functionalities of a remote sensing set compliant with FIG. 1;

FIG. 17 is a block diagram illustrating an implementation of a sonar integrating the functionalities of a remote sensing set compliant with FIG. 1.

DETAILED DESCRIPTION OF EMBODIMENTS

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, a single shared processor, or a plurality of individual processors, some of which may be shared. Moreover, explicit use of the term "processor" should not be construed to refer exclusively to hardware capable of executing software, and refers in a general way to a processing device, which can for example include a computer, a microprocessor, an integrated circuit, or a programmable logic device (PLD). Additionally, the instructions and/or data enabling to perform associated and/or resulting functionalities may be stored on any processor-readable medium such as, e.g., an integrated circuit, a hard disk, a CD (Compact Disc), an optical disc such as a DVD (Digital Versatile Disc), a RAM (Random-Access Memory) or a ROM memory. Instructions may be notably stored in hardware, software, firmware or in any combination thereof.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces.

A remote sensing set 1 compliant with the invention, as represented on FIG. 1, comprises an emission device 11 for emitting pulsed waves 21 towards one or more objects 2 on which measurements are intended to be carried out via a propagation medium 20, and a reception device 12 for receiving waves 22 transmitted by the object(s) 2 upon receiving the waves 21.

According to the implementations, the object 2 illustrated in a generic manner can notably consist in a solid object, airborne molecules or particles, a fluid such as for instance oil, living beings such as for instance schools of fish. The medium 20 can in particular consist in the atmosphere or the ocean. The waves 21 received by the object 2 generate waves 23 that can be notably reflected, backscattered or emitted by fluorescence. The waves 21, 22 and 23 can be of any type, and notably acoustic or electromagnetic such as radio or light waves. Only a part, generally small, of the waves 23 reaches the reception device 12 as the waves 22.

The devices 11 and 12 are represented side by side on FIG. 1, but can also be distant from each other. They are thus preferably connected by a remote wired or wireless communication system for example via a 3G or LTE (for "Long Term Evolution") cell network, a cable transmission associated with local wireless transmissions of the WiFi type, or any other means.

Figure 2:
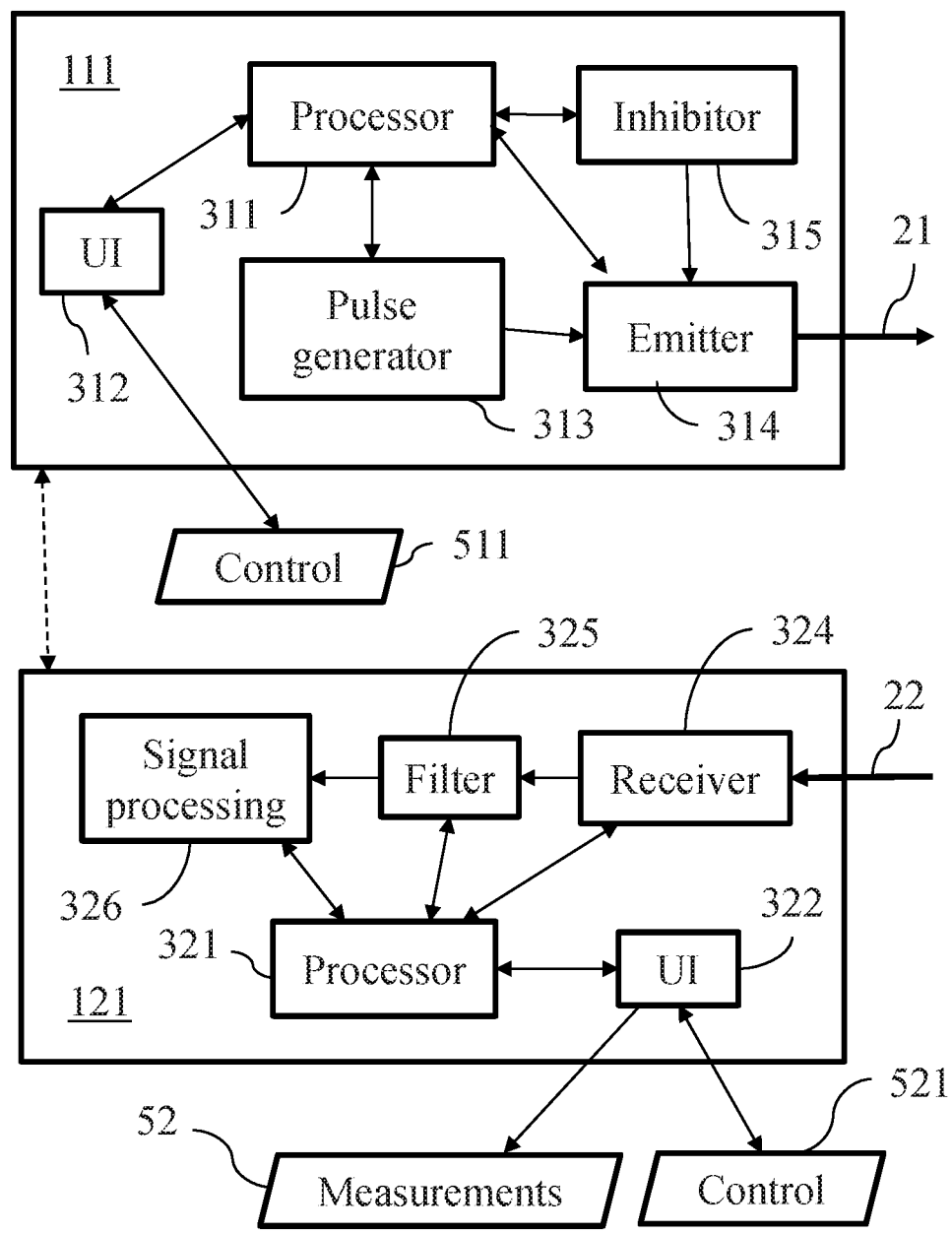
FIG. 2 represents as a block diagram a first embodiment of the sensing set of FIG. 1, involving distinct and communicating entities for the respective emission and reception parts.

In a first embodiment (FIG. 2), the emission device 11, noted 111, includes a pulse generator 313 and an emitter 314 receiving pulse signals from the generator 313, for example in electronic form, and emitting the waves 21 in function of those signals. It comprises also one or more processor(s) 311 connected to all the modules of the device 111 requiring control or command operations.

One or more user interface(s) 312 (UI), linked notably to the processor 311, allow a user to enter or obtain control or monitoring information 511.

User interface means here as hereinbelow any appropriate means for entering of retrieving data, information and/or instructions, notably any visual, tactile and/or audio capacities that can encompass notably a screen, a keyboard, a trackball, a touchpad, a touchscreen, a loudspeaker, or a voice recognition system.

The emission device 111 further comprises a pulse inhibitor 315, which can act on the emitter 314 so as to prevent the transmission of part of the pulse signals, notably according to determined inhibition periods.

The reception device 12, noted 121 in the first embodiment, comprises as for it a receiver 324 of the waves 22, a spectral filter 325 enabling to select considered frequency ranges, and a signal processing unit 326, dedicated to processing the data from the filter 325. Like for the emission device 111, the device 121 also includes a processor 321 and a user interface 322, which allows users to manage control or monitoring information 521 and to obtain measurements results 52.

Though the devices 111 and 121 are represented as separate entities, they are linked one to the other and can notably be embodied in a same apparatus. In that case, the processors 311 and 321 can be merged, as well as the user interfaces 312 and 322. Furthermore, a common interface can also be utilised in some cases for emitting and receiving waves, such as for example antennas, insofar as that interface is suitable for both types of operations. Preferably, given the significant differences in the power and possibly in the concerned emission and reception frequencies, the respective interfaces are distinct. For example, bistatic or multistatic radars or sonars are advantageously employed.

Figure 3:
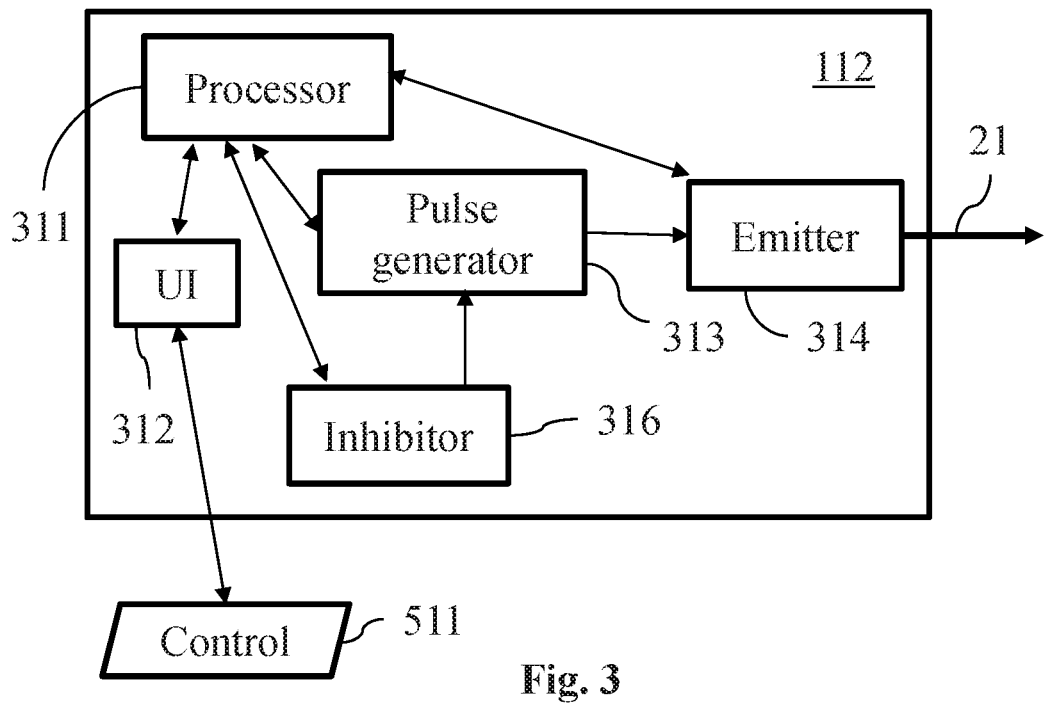
FIG. 3 represents as a block diagram a variant of the first embodiment of FIG. 2.

In a variant embodiment of the emission device 11, noted 112 and represented on FIG. 3, the emission device differs from the preceding one in that it comprises a pulse inhibitor 316 configured for acting upstream of the emitter 314 on the pulse generator 313.

In a second embodiment of the remote sensing set, illustrated on FIG. 4A and noted 131, the emission and reception operations are coupled via signal interference. That embodiment is particularly adapted to a lidar using optical heterodyne detection. That set 131 comprises like for the emission and reception devices of the first embodiment a processor 331 and a user interface 332, allowing to manage control or monitoring information 531 and to obtain measurement data 52 related to remote sensing. It also comprises the pulse generator 313, the inhibitor 315 (which is acting directly at the emission level in this embodiment) and the signal processing unit 326.

The specificities of that second embodiment are due to the presence of an emitter-receiver 334 grouping the emission functions of the emitter 314 and the reception functions of receiver 324 and having a coherent detection. As visible on FIG. 4B, the waves generated by the emitter 314 on the basis of the pulse signals transmitted by the pulse generator 313 are subject to a partial extraction in addition to the emitted waves 21, by a separator 335. The latter communicates the waves to a modulator 336, which transforms the received signal in an appropriate way according to a process known by a person skilled in the art, typically by an offset to a determined frequency.

The output from the modulator 336 and the signal captured by the receiver 324 are transmitted to an interferometer 337, which in the process indicated above generates a term oscillating around the offset frequency (heterodyne frequency). A heterodyne signal, carrying the useful information, can thus be extracted from the interferometer by electronic filtering in the neighbourhood of that frequency.

In an alternative embodiment, particularly adapted to a lidar using optical homodyne detection, the modulator 336 is absent, The following part of the disclosure will help to gain more insight into the stakes and consequences of the pulse inhibition.

The frequency properties of a periodic rectangular pulse signal are well known, and very useful for examining the effective properties of periodic pulse signals. Such a time signal takes the form of a repeated gate function P, as visible on FIG. 5A, which comprises rectangular units 611, each having a duration τ, and being consecutively spaced one period T apart. According to formulas known from the state of the art, the Fourier transform of such a function is given by a function $\hat{P}$ (represented on FIG. 5B), centred on frequency 0 and comprising frequency peaks 621 consecutively spaced one pulse frequency 1/T apart. Those peaks follow a cardinal sine (noted sinc) envelope 622, the expression of which is given below in function of frequency ν, the notation δ designating the Dirac distribution schematically associated with punctual peak values:

$$\sum_{n=-\infty}^{+\infty} -\infty \frac{\tau}{T} \operatorname{sinc}\left(\frac{n\tau}{T}\right) \times \delta\left(\nu - \frac{n}{T}\right)$$

with:

$$\operatorname{sinc}(u) = \frac{\sin \pi u}{\pi u}$$

That envelope admits then a main lobe 620 decreasing in frequency down to zero at frequency 1/τ, followed by globally decreasing lobes 622, each of which covers a frequency range comprised between multiples of 1/τ and reaching zero at its ends. Thus, a high ratio of the pulse period T to the pulse duration τ yields a higher number of significant frequency peaks (in the example represented on FIG. 5B, that ratio is worth 10).

When this ratio reaches a sufficient level, for example 100, the behaviour of the function $\hat{P}$ is similar, in a whole frequency range centered on zero and sufficiently low with respect to 1/τ, to a sequence of unitary frequency pulses corresponding to instantaneous pulse signals.

Knowing the mechanisms of that repeated gate function P is important (see FIG. 6), because the periodic pulses of any kind can be expressed in a general way as the product over time of the rectangular units 611 of the function P with a determined signal 613 during a pulse duration τ. The frequency behaviour of that time product is then obtained by convolution of the Fourier transforms of the two functions.

In particular, it is interesting to note the frequency spectrum obtained for a frequency modulation at a frequency $\nu_0$, periodically repeated in the rectangular units 611. For sake of convenience, the presentation is made on the ground of a coherent signal at frequency $\nu_0$ (see FIG. 7), while modulations can yield various kinds of spectral modifications depending notably on the type of performed modulations. Such a function G has a frequency spectrum $\hat{G}$ centred on the frequency $\nu_0$, and evolving in its neighbourhood analogously to the transform $\hat{P}$ of the gate function in the neighbourhood of zero. Hence it comprises frequency peaks 625 spaced the pulse frequency apart and arranged according to an envelope 624 given by a cardinal sine that tends towards zero when the frequency tends towards $\nu_{0+}1/\tau$.

Consequently, when the modulation frequency $\nu_0$ (or the carrier frequency) is very high with respect to 1/τ, which is for example commonly the case for pulsed lasers, the frequency range excited around $\nu_0$ is relatively narrow. The increased capacities in very short durations and high repetition frequencies and the associated advantages lead however increasingly often to situations in which the frequency loads in the neighbourhood of $\nu_0$ take on greater importance.

In an extreme case, anyway convenient for understanding better the involved mechanisms, the periodically applied pulses are equated to instantaneous signals instead of gates (FIG. 8A). The corresponding time function D (repeated Dirac distributions) is thus defined by a succession of peaks 630 spaced the pulse period T apart.

The resulting Fourier transform (FIG. 8B) is a function $\hat{D}$ comprising an infinite sequence of frequency peaks 640 spaced the pulse frequency 1/T apart. In other words, the periodic repetition of peaks at the frequency 1/T excites not only the concerned frequency, but also all its multiple frequencies. That phenomena is attenuated more or less quickly in practice in the presence of gate functions, due to the amplitude decrease expressed by the cardinal sine.

What follows is expressed from that function D, for sake of disclosure convenience. The obtained results can nevertheless be easily transposed into practical situations with pulse signals, as suggested below.

In addition, it can be kept in mind that with respect to the following presentation, considerations on energies lead to squared values of the signal amplitudes, thereby to squared ratios between such amplitudes.

In a first example of pulse inhibition, illustrated on FIG. 9A, one pulse out of three is removed in the repetition of the peaks 630. The result in frequency terms, given on FIG. 9B, shows that the signal is transformed by the decrease of the peaks 641 located at frequencies multiple of 1/T and by the emergence of new frequency peaks 642. The latter are located at frequencies corresponding to a partition into three sections of the frequency ranges bounded by the multiples of the pulse frequency 1/T. More precisely, the peaks 641 reach ⅔ of the amplitude of the peaks of the function D, while the peaks 642 represent ⅓ of that value. The introduction of the inhibition pulses therefore leads to an internal spreading between the peaks distributed according to multiples of the pulse frequency 1/T.

A similar result is observed for the periodic rectangular function P. In that case, it merely appears that the amplitude values at the frequency peaks as represented on FIG. 9B are weighted by the cardinal sine envelope function. Depending on the pulse duration τ with regard to the period T, that weighting has a more or less marked effect.

That observation on the gate function P generally stands for pulse inhibitions, and enables to obtain simply the associated information from the information related to the function D. It is just needed in each case to take into account the cardinal sine envelope weighting, the principle of which is presented above.

The capability to excite at the same time the pulse frequency and frequencies that are worth the third thereof or their multiples is remarkable as such. In the case where the loading frequency spectrum relies on the pulse repetition frequency, for example for fast pulses without intra-pulse modulation, it is thereby made possible by a unique wave emission towards an object to access simultaneously information that would normally require more complex implementations or successive measurements over time. In advantageous embodiments, a gain in measurement speed can then be obtained, regarding notably mobile objects or complex measurements.

In comparison, a mere frequency decrease, for instance by multiplying the pulse period by a factor 3, has the drawback of reducing the data acquisition frequency. Moreover, it leads to weakening the effective loading weight of the pulse frequency at 1/T, though the latter is a multiple of 1/(3T). That frequency 1/T is indeed affected in practice by the pulse duration and does not benefit from a privileged distribution weight compared with the other frequency multiples of 1/(3T).

In the common situation where the frequency modulation during the pulse is determining for the measurements, a high pulse repetition frequency is often desirable. The pulse inhibition method is then likely to allow in some cases to mitigate the disturbing effects of the pulses without undermining significantly the advantages of fast pulses. Indeed, it amounts to distributing the energy linked to high pulse frequency contents towards lower frequencies, presently down to three times lower in the illustrated example.

The flexibility of the described technique will appear more clearly with multiple further embodiment examples mentioned below.

In particular, in other embodiments, a pulse inhibition is applied with a single period higher than 3T, of the type K×T with K being an integer greater than 3. A frequency spectrum is then obtained, in which the multiples of 1/T are weighted by a factor equal to (K−1)/K with respect to the reference signal D, and the other multiples of 1/(KT) are weighted by a factor 1/K. Increasing K thus leads to maintaining an all the higher relative weight at the pulse frequency 1/T while involving a larger number of frequencies, but at a relative level of presence in the spectrum that decreases in a sensibly hyperbolic way with K (the ratio of the two levels being worth 1/(K−1)).

The pulse inhibition based on two combined ratios is illustrated on FIGS. 10A and 10B, with the example of 5T and 7T. The removal of the corresponding peaks 630 leads to a spectrum involving the multiples of 1/(35×T), with four distinct levels depending on the frequency peaks:

24/35 for the peaks 6431 rising at multiples of 1/T,
6/35 for the other peaks 6432 rising at multiples of 1/(5T),
4/35 for the other peaks 6433 rising at multiples of 1/(7T),
1/35 for the other peaks 6434 rising at multiples of 1/(35T) ("others" referring to the preceding peaks in the list).

The frequency coverage is thus sensibly refined, by a factor of 35, while making possible a preservation of a high data acquisition pace and a good representation of the pulse frequency in the spectrum. The representation of the interspersed frequencies is however relatively weak, the highest relative level corresponding to a factor ¼ with respect to the peaks associated with the multiples of the pulse frequencies.

FIGS. 11A and 11B correspond to periods 3T and 5T, and lead to introducing frequency multiples of 1/(15T) in the spectrum, also according to four distinct levels but closer together than previously:

8/15 for the peaks 6441 rising at multiples of 1/T,
4/15 for the other peaks 6442 rising at multiples of 1/(3T),
2/15 for the other peaks 6443 rising at multiples of 1/(5T),
1/15 for the other peaks 6444 rising at multiples of 1/(15T).

More generally, with the use of pairwise coprime factors $Q_1, Q_2, Q_3 \ldots Q_N$ for the pulse inhibitions ($Q_i$ being a ratio between one of the inhibition periods and the pulse period T), the frequency pulse spectrum extends to the elementary frequency equal to the quotient of 1/T by $Q_1 \times Q_2 \times Q_3 \times \ldots \times Q_N$, and to its multiples.

In addition, the relative amplitude coefficients with regard to the repeated Dirac function D are given by the following formula:

if the considered frequency is a multiple of the elementary frequency by factors $Q_{i1}, Q_{i2} \ldots Q_{ik}$, then the coefficient is worth
$[(Q_{i1}-1) \times (Q_{i2}-1) \times \ldots \times (Q_{ik}-1)]/[Q_1 \times Q_2 \times Q_3 \times \ldots \times Q_N]$ if the considered frequency is not a multiple of the elementary frequency by any of the factors $Q_1, Q_2, Q_3 \ldots Q_N$, then the coefficient is worth
$1/[Q_1 \times Q_2 \times Q_3 \times \ldots \times Q_N]$.

The pairwise coprime factors therefore offer a wide range of adjustment possibilities, with effects on the emitted spectrum that are likely to be potentially well managed. The simplicity of the frequency level distribution formulas can indeed constitute a precious help in the choice of the parameters.

For factors that are not pairwise coprime, the frequency pulse spectrum extends to the elementary frequency equal to the quotient of 1/T by the least common multiple of those factors, and to its multiples.

An example of non-coprime factors is given in relation with FIGS. 12A and 12B, for periods 4T and 6T. The resulting spectrum reveals four amplitude levels:

⅔ for the peaks 6451 rising at multiples of 1/T,
⅓ for the other peaks 6452 rising at multiples of 1/(2T),
⅙ for the other peaks 6453 rising at multiples of 1/(4T),
1/12 for the other peaks 6454 rising at multiples of 1/(12T).

The exploitation of non-pairwise coprime factors can thus offer interesting additional adjustment possibilities.

Further to the analytical formulas mentioned above, the factors associated with the frequency peaks for the pulse inhibitions can be obtained in several manners. One of them consists in obtaining them numerically by Fourier transform.

Another one consists in applying analytically a Fourier transform to the developments linked to the Dirac distribution sequences, by using the facts that the sum of the roots of unity is worth 0 and that a truncated sequence of Dirac distributions can be replaced with differences between the completed sequence and sequences corresponding to the truncation.

A possible operation of the remote sensing set 1 comprises the following steps, illustrated on FIG. 13:

at the outset (step 71), effecting a preliminary assessment of frequencies to be excited for an object 2;

from that assessment, determining (step 72) a main pulse repetition frequency 1/T, together with useful divisors of that frequency in the frame of pulse inhibitions;

hence tuning the emission device accordingly and emitting corresponding pulsed waves by that device (step 73);

receiving the waves transmitted back by the objects 2, for remote sensing (step 74);

then proceeding with the signal processing and the data analysis (step 75) leading to measurement results 52.

More specific embodiments developed below will enable to gain a better insight into the application modalities of the remote sensing set 1.

A coherent detection lidar 801 represented on FIG. 14 comprises, in addition to a processor 831 and a user interface 832 (the relations of which with the other elements are not reproduced on the figure), a pulse laser emitter 814, having a variable attenuator. The laser can consist for example in a neodymium-based power laser used at 1064 nm, but multiple other implementations remain within the scope of the present disclosure, including notably Rayleigh or Mie lidars, Raman, Fluorescence or Differential absorption lidars. Its average power is for example between 100 and 300 mW, and the emitted pulses have a pulse duration in the order of picoseconds with a pulse repetition frequency comprised between 100 kHz and 1 GHz. The obtained laser pulses deliver for example 10 to 50 mJ per pulse.

Lasers allowing very short high power pulses are also judicious choices for implementing the described processes, including Q-switched or mode-locked lasers.

The lidar 801 further comprises a separator 835 downstream of the emitter 814 and enabling to separate the emitted beam by reserving a part extracted from that beam to an acousto-optic modulator (AOM) or Bragg cell 836. That modulator 836 is able to apply a predefined frequency offset, allowing to perform an interferometry with received beams. Optics 817 are provided for shaping the main laser beam output from the separator 835, before an emission as waves 91.

The lidar 801 also comprises a second AOM 815, provided for acting on the laser emitter 814 so as to exclude emissions corresponding to the multiples of the repetition frequency T that are predefined for the inhibition. Multiple means other than a Bragg cell can be employed for preventing the transmission corresponding to those inhibition periods, including mechanical means such as shutters, chopper wheels or rotating mirrors, or electro-optic or acousto-optic means such as a Pockels cell or a Kerr cell.

The lidar 801 further comprises a light collector or collecting optics 824 provided for receiving light beams 92 output from the objects to be probed, followed by a spatial filter 827. A photodetector serving as an interferometer 837 is provided for collecting the signals output from the filter 827, together with those coming from the modulator 836 and representative of the emitted beams. A bandpass filter 839 is adapted to receive the signal output from the interferometer and to extract therefrom a heterodyne signal, communicated to a signal processing unit 826.

Another lidar 802, with incoherent detection, is represented on FIG. 15. By contrast with the preceding one, it does not include an interferometry system (separator 835, AOM 836, interferometer 837, bandpass filter 839) but a spectral narrow-band filter 825 downstream of the spatial filter 827. A photodetector 828 is provided for receiving the obtained signal and transmitting the detection result to the signal processing unit 826.

Another application example of the present disclosure concerns a pulse multistatic radar 840, represented on FIG. 16. Further to a processor 841 and a user interface 842 (the relations of which with the other elements are not reproduced on the figure), it includes an emission block 85 and a reception block 86.

Any frequency ranges can be concerned by the present disclosure, notably comprised between 1 and 100 GHz.

The emission block 85 comprises a radio emitter 854 fed by a pulse generator 853 via an amplifier 857. The pulse generator 853 comprises a permanent oscillator 8531, such as for example a klystron, and a modulator 8532 of the signals emitted by that oscillator 8531. The modulator is for example a commutator of the thyratron type, but in some embodiments, its function is fulfilled by the oscillator 8531 itself, consisting in a klystron.

The pulses produced by the pulse generator 853 have for example a duration in the order of 1 μs.

An electronic control unit 856 allows to control the pulses produced by the generator 853, and notably to exclude the pulse inhibition periods.

The emission block 85 also comprises a waveguide 858 provided for receiving the pulse signal output from the emitter 854 and for transmitting it to an antenna 859 for emitting waves 95 towards the objects to be probed.

The reception block 86 includes an antenna 869 for receiving waves 96 from the objects to be probed, together with a radio receiver 864. The output of that receiver 864 is submitted to a filter 865 before being transmitted to a signal processing unit 866.

An additional implementation represented on FIG. 17 regards a bistatic active sonar 870. The latter includes, further to a processor 871 and a user interface 872 (the relations of which with the other elements are not reproduced on the figure), an emission block 88 and a reception block 89. For sake of illustration, the sonar 870 enables emissions at frequencies comprised between 10 and 100 kHz.

The emission block 88 comprises a sonar projector 880, adapted to generate pulse signals intended for an antenna 889 made up of hydrophones, for transmitting acoustic waves 98. The sonar projector 880 includes a signal generator 883 under the control of an electronic control unit 886. The latter is able to act on the projector 880 so as to prevent the transmission of pulse signals corresponding to the inhibition periods.

The projector 880 also comprises successively, downstream from the signal generator 883, an amplifier 887, an electroacoustic transducer 888, for example piezoelectric or magnetostriction-based, and a beam generator 884. The latter is able to transmit the emission signals to the hydrophones 889.

The reception block 89 includes hydrophones 899 able to receive the acoustic waves 99 received as echoes from objects to be probed, an analog-to-digital converter 894 required for exploiting the signals and a signal processing unit 896.

On the ground of the present disclosure and of the detailed embodiments, other implementations are possible and within the reach of a person skilled in the art without departing from the scope of the invention. Specified elements can notably be interchanged or associated in any manner remaining within the frame of the present disclosure. Also, elements of different implementations may be combined, supplemented, modified, or removed to produce other implementations. Multiple other examples of lidars, radars and sonars can also been developed while preserving the described functionalities. All those possibilities are contemplated by the present disclosure.

The invention claimed is:

1. An emission device for remote sensing comprising:
    at least one pulse generator, adapted to produce periodically pulse signals in elementary time windows over a representative time range, said time windows being successively spaced one pulse period apart,
    at least one wave emitter, adapted to emit waves towards at least one measurement object distant from the emission device, so as to enable to monitor waves having a frequency content, transmitted by said at least one object upon receiving at least part of said waves emitted by said device, said at least one wave emitter being coupled with said at least one pulse generator so that said emitted waves correspond to said pulse signals produced over said representative time range,
    at least one processor adapted to setting parameters suited to producing measurement information on said at least one measurement object from said wave monitoring, based on at least part of said frequency content,
    said at least one pulse generator, at least one wave emitter and at least one processor being specially adapted so that said pulse period contributes to said at least part of said frequency content on which producing said measurement information is based, wherein said emission device comprises at least one pulse inhibition system configured for preventing periodically the emission of said waves by said emission device, according to at least one inhibition period being an integer multiple of said pulse period and equal to at least three times said pulse period, said at least one pulse generator, at least one wave emitter and at least one processor being specially adapted so that said at least one inhibition period also contributes to said at least part of said frequency content on which producing said measurement information is based.

2. The emission device according to claim 1, wherein said at least one inhibition system is configured so that said at least one inhibition period includes at least two distinct inhibition periods, none of said distinct inhibition periods being a multiple of any other of said distinct inhibition periods.

3. The emission device according to claim 2, wherein said at least one inhibition system is configured so that said distinct inhibition periods have ratios with respect to the pulse period which are pairwise coprime.

4. The emission device according to claim 1, wherein said waves emitted by said emission device are unmodulated over each of said pulse signals.

5. The emission device according to claim 1, wherein said elementary time windows having a pulse duration, said emission device is configured so that said waves emitted by said emission device comprise at least one modulation at a frequency higher than the reciprocal of said pulse duration.

6. The emission device according to claim 1, wherein said at least one inhibition system is adapted to cooperate with said pulse generator so that said pulse signals are truncated according to said at least one inhibition period.

7. The emission device according to claim 1, wherein said at least one inhibition system is adapted to cooperate with said wave emitter so that the emission of said waves by said wave emitter is inactivated for said waves corresponding to said inhibition period.

8. A reception set for remote sensing comprising:
   at least one receiver of waves having a frequency content, transmitted by at least one object upon the reception by said object of waves emitted by at least one emission device, said receiver being adapted to generate signals corresponding to said received waves,
   at least one signal processing unit coupled with said at least one wave receiver, configured for receiving and processing said signals so as to produce measurement information related to said at least one object based on at least part of said frequency content,
   at least one system for frequency consideration coupled with at least one of said at least one receiver and at least one processing unit, configured for taking at least part of said frequency content of said transmitted waves into consideration, in order to produce said measurement information, said frequency consideration system being adapted to take into consideration a pulse period of said emitted waves so that said pulse period contributes to said at least part of said frequency content on which producing said measurement information is based,
   said system for frequency consideration is configured to take into account at least one inhibition period being an integer multiple of said pulse period and equal to at least three times said pulse period, so that said at least one inhibition period also contributes to said at least part of said frequency content on which generating said measurement information is based.

9. The reception set according to claim 8, wherein said system for frequency consideration is configured so that said at least one inhibition period includes at least two distinct inhibition periods, none of said distinct inhibition periods being a multiple of any other of said distinct inhibition periods.

10. The reception set according to claim 8, wherein said reception set includes said at least one emission device, said at least one emission device comprising:
    at least one pulse generator, adapted to produce periodically pulse signals in elementary time windows over a representative time range, said time windows being successively spaced said pulse period apart,
    at least one wave emitter, adapted to emit said waves towards said at least one object, so as to enable to monitor said waves having said frequency content, transmitted by said at least one object upon receiving at least part of said waves emitted by said at least one emission device, said at least one wave emitter being coupled with said at least one pulse generator so that said emitted waves correspond to said pulse signals produced over said representative time range,
    at least one processor adapted to setting parameters suited to producing said measurement information on said at least one object from said wave monitoring, based on said at least part of said frequency content,
    said at least one pulse generator, at least one wave emitter and at least one processor being specially adapted so that said pulse period contributes to said at least part of said frequency content on which producing said measurement information is based,
    wherein said emission device comprises at least one pulse inhibition system configured for preventing periodically the emission of said waves by said emission device, according to said at least one inhibition period, said at least one pulse generator, at least one wave emitter and at least one processor being specially adapted so that said at least one inhibition period also contributes to said at least part of said frequency content on which producing said measurement information is based,
    and at least one system for coupling said waves received by said at least one receiver with at least part of said waves emitted by said at least one wave emitter, so as to produce interferences between said waves, said signal processing unit of said reception set being adapted to exploit said interferences for producing said measurement information based on said at least part of said frequency content.

11. A remote sensing apparatus selected among a lidar, a radar, an active sonar and an ultrasound instrument, wherein said remote sensing apparatus comprises an emission device according to claim 1.

12. An emission process for remote sensing, including:
    periodically generating pulse signals in elementary time windows over a representative time range, said time windows being successively spaced one pulse period apart,
    emitting waves corresponding to said pulse signals generated over said representative time range towards at least one remote measurement object, so as to enable to monitor waves having a frequency content, transmitted by said at least one object upon receiving at least part of said emitted waves, setting parameters suited to producing measurement information on said at least one measurement object from said wave monitoring, based on at least part of said frequency content, said pulse signals, waves and parameters being specially adapted so that said pulse period contributes to said at least part of said frequency content on which producing said measurement information is based, wherein said process includes preventing periodically the emission of said waves, according to at least one inhibition period being an integer multiple of said pulse period and equal to at least three times said pulse period, said pulse signals, waves and parameters being specially adapted so that said at least one inhibition period also contributes to said at least part of said frequency content on which producing said measurement information is based.

13. The emission process according to claim 12, wherein said at least one inhibition period includes at least two distinct inhibition periods, none of said distinct inhibition periods being a multiple of any other of said distinct inhibition periods.

14. A reception process for remote sensing, including:
receiving waves having a frequency content, transmitted by at least one object upon the reception by said object of waves emitted by at least one emission device,
generating signals corresponding to said received waves,
receiving and processing said signals so as to produce measurement information related to said at least one object based on at least part of said frequency content,
said process being such that for generating said measurement information, a pulse period of said emitted waves is taken into consideration so that said pulse period contributes to said at least part of said frequency content on which producing said measurement information is based,
wherein said process includes taking into consideration at least one inhibition period being an integer multiple of said pulse period and equal to at least three times said pulse period, so that said at least one inhibition period also contributes to said at least part of said frequency content on which producing said measurement information is based.

15. The reception process according to claim 14, wherein said at least one inhibition period includes at least two distinct inhibition periods, none of said distinct inhibition periods being a multiple of any other of said distinct inhibition periods.

16. A non-transitory program storage device, readable by a computer, tangibly embodying a program of instructions executable by the computer in an emission process for remote sensing, said emission process including:
periodically generating pulse signals in elementary time windows over a representative time range, said time windows being successively spaced one pulse period apart,
emitting waves corresponding to said pulse signals generated over said representative time range towards at least one remote measurement object, so as to enable to monitor waves having a frequency content, transmitted by said at least one object upon receiving at least part of said emitted waves,
setting parameters suited to producing measurement information on said at least one measurement object from said wave monitoring, based on at least part of said frequency content,
said pulse signals, waves and parameters being specially adapted so that said pulse period contributes to said at least part of said frequency content on which producing said measurement information is based, said process including preventing periodically the emission of said waves, according to at least one inhibition period being an integer multiple of said pulse period and equal to at least three times said pulse period, said pulse signals, waves and parameters being specially adapted so that said at least one inhibition period also contributes to said at least part of said frequency content on which producing said measurement information is based,
wherein said program of instructions is configured to perform said setting of said parameters and said preventing periodically the emission of said waves.

17. A non-transitory program storage device, readable by a computer, tangibly embodying a program of instructions executable by the computer in a reception process for remote sensing, said reception process including:
receiving waves having a frequency content, transmitted by at least one object upon the reception by said object of waves emitted by at least one emission device,
generating signals corresponding to said received waves,
receiving and processing said signals so as to produce measurement information related to said at least one object based on at least part of said frequency content,
said process being such that for generating said measurement information, a pulse period of said emitted waves is taken into consideration so that said pulse period contributes to said at least part of said frequency content on which producing said measurement information is based,
said process including taking into consideration at least one inhibition period being an integer multiple of said pulse period and equal to at least three times said pulse period, so that said at least one inhibition period also contributes to said at least part of said frequency content on which producing said measurement information is based,
wherein said program of instructions is configured to perform said processing of said signals so as to produce said measurement information.

18. The non-transitory program storage device according to claim 16, wherein said at least one inhibition period includes at least two distinct inhibition periods, none of said distinct inhibition periods being a multiple of any other of said distinct inhibition periods.

19. The non-transitory program storage device according to claim 17, wherein said at least one inhibition period includes at least two distinct inhibition periods, none of said distinct inhibition periods being a multiple of any other of said distinct inhibition periods.

20. A remote sensing apparatus selected among a lidar, a radar, an active sonar and an ultrasound instrument, wherein said remote sensing apparatus comprises a reception set according to claim 8.

21. The emission device according to claim 1, wherein said at least one inhibition system is configured for preventing periodically the emission of said waves by said emission device according to each of said at least one inhibition period, for one of said pulse signals out of said integer multiple associated with said each of said at least one inhibition period.

22. The reception set according to claim 8, wherein said system for frequency consideration is configured for taking into account for each of said at least one inhibition period, one pulse signal inhibition out of said integer multiple associated with said each of said at least one inhibition period.

23. The non-transitory program storage device according to claim 16, wherein said emission process includes preventing periodically the emission of said waves according to each of said at least one inhibition period, for one of said pulse signals out of said integer multiple associated with said each of said at least one inhibition period.

24. The non-transitory program storage device according to claim 17, wherein said reception process includes taking into account for each of said at least one inhibition period, one pulse signal inhibition out of said integer multiple associated with said each of said at least one inhibition period.

* * * * *